United States Patent
O'Reilly

(10) Patent No.: US 10,171,510 B2
(45) Date of Patent: Jan. 1, 2019

(54) SYSTEM AND METHOD FOR MONITORING AND GRADING A CYBERSECURITY FRAMEWORK

(71) Applicant: CyberSaint, Inc., Acton, MA (US)

(72) Inventor: Padraic O'Reilly, Belmont, MA (US)

(73) Assignee: CyberSaint, Inc., Concord, MA (US)

( * ) Notice: Subject to any disclaimer, the term of this patent is extended or adjusted under 35 U.S.C. 154(b) by 0 days.

(21) Appl. No.: 15/809,466

(22) Filed: Nov. 10, 2017

(65) Prior Publication Data
US 2018/0167414 A1 Jun. 14, 2018

Related U.S. Application Data

(60) Provisional application No. 62/434,086, filed on Dec. 14, 2016.

(51) Int. Cl.
*H04L 29/06* (2006.01)
*G06N 3/08* (2006.01)

(52) U.S. Cl.
CPC .............. *H04L 63/20* (2013.01); *G06N 3/08* (2013.01)

(58) Field of Classification Search
CPC .................................. H04L 63/20; G06N 3/08
See application file for complete search history.

(56) References Cited

U.S. PATENT DOCUMENTS

| | | |
|---|---|---|
| 9,177,139 B2 | 11/2015 | Hull Roskos |
| 9,280,911 B2 | 3/2016 | Sadeh-Koniecpol et al. |
| 9,294,498 B1 | 3/2016 | Yampolshiy et al. |
| 9,306,965 B1 | 4/2016 | Grossman et al. |
| 9,373,267 B2 | 6/2016 | Sadeh-Koniecpol et al. |
| 9,398,029 B2 | 7/2016 | Sadeh-Koniecpol et al. |
| 9,501,647 B2 | 11/2016 | Yampolskiy et al. |
| 9,558,677 B2 | 1/2017 | Sadeh-Koniecpol et al. |
| 9,602,529 B2 | 3/2017 | Jones et al. |
| 9,614,669 B1 | 4/2017 | Cox, Jr. et al. |
| 9,774,626 B1 | 9/2017 | Himler et al. |
| 9,781,149 B1 | 10/2017 | Himler et al. |

(Continued)

OTHER PUBLICATIONS

NIST, "Framework for Improving Critical Infrastructure Cybersecurity", National Institute of Standards and Technology, Published Feb. 12, 2014, Retrieved From https://www.nist.gov/sites/default/files/documents/cyberframework/cybersecurity-framework-021214.pdf (Year: 2014).*

(Continued)

*Primary Examiner* — Chau Le
(74) *Attorney, Agent, or Firm* — Cesari and McKenna, LLP

(57) ABSTRACT

A cybersecurity system is provided that sums and scores one or more cybersecurity controls for different client computing systems that each have different attributes, needs, and interests. In addition, the cybersecurity system provides to each different client computing system auto-suggestions that suggest one or more ways in which the client computing system may improve the confidentiality, integrity, and availability of the information stored on the client computing system and/or improve the confidentiality, integrity, and availability of the underlying characteristics of the client computing system. In addition, the cybersecurity system verifies that the functioning of the client computing system has improved.

36 Claims, 19 Drawing Sheets

(56) References Cited

U.S. PATENT DOCUMENTS

| | | | |
|---|---|---|---|
| 9,813,454 B2 | 11/2017 | Sadeh-Koniecpol et al. | |
| 9,824,609 B2 | 11/2017 | Sadeh-Koniecpol et al. | |
| 9,870,715 B2 | 1/2018 | Sadeh-Koniecpol et al. | |
| 9,875,360 B1 | 1/2018 | Grossman et al. | |
| 2006/0191010 A1* | 8/2006 | Benjamin | G06F 21/552 726/23 |
| 2007/0016955 A1* | 1/2007 | Goldberg | G06Q 40/08 726/25 |
| 2007/0245420 A1* | 10/2007 | Yong | H04L 41/28 726/23 |
| 2012/0137367 A1* | 5/2012 | Dupont | G06F 21/00 726/25 |
| 2013/0031037 A1* | 1/2013 | Brandt | H04L 63/1408 706/12 |
| 2013/0031633 A1* | 1/2013 | Honig | G06F 21/554 726/23 |
| 2013/0238534 A1* | 9/2013 | Nagaraj | H04L 41/04 706/12 |
| 2014/0007238 A1* | 1/2014 | Magee | G06F 21/577 726/24 |
| 2014/0053226 A1* | 2/2014 | Fadida | H04L 67/34 726/1 |
| 2015/0026061 A1* | 1/2015 | Siegel | G06Q 20/4016 705/44 |
| 2015/0213369 A1* | 7/2015 | Brandt | H04L 63/1408 706/12 |
| 2016/0219077 A1* | 7/2016 | Pandya | H04L 63/20 |

OTHER PUBLICATIONS

National Institute of Standards and Technology (NIST) 800-53-Rev. 4, Security and Privacy Controls for Federal Information Systems and Organizations, Joint Task Force Transformation Initiative, U.S. Department of Commerce, Apr. 30, 2013.

ISO/IEC 27000, International Standard, Information Technology—Security Techniques—Information Security Management Systems—Overview and Vocabulary, $4^{th}$ Edition, Feb. 15, 2016, 42 pages.

Framework for Improving Critical Infrastructure Cybersecurity, Version 1.0, National Institute of Standards and Technology, Feb. 12, 2014, 41 pages.

Defense Federal Acquisition Regulation Supplement (DFARS), Department of Defense, revised Jun. 7, 2016, uploaded in three parts.

\* cited by examiner

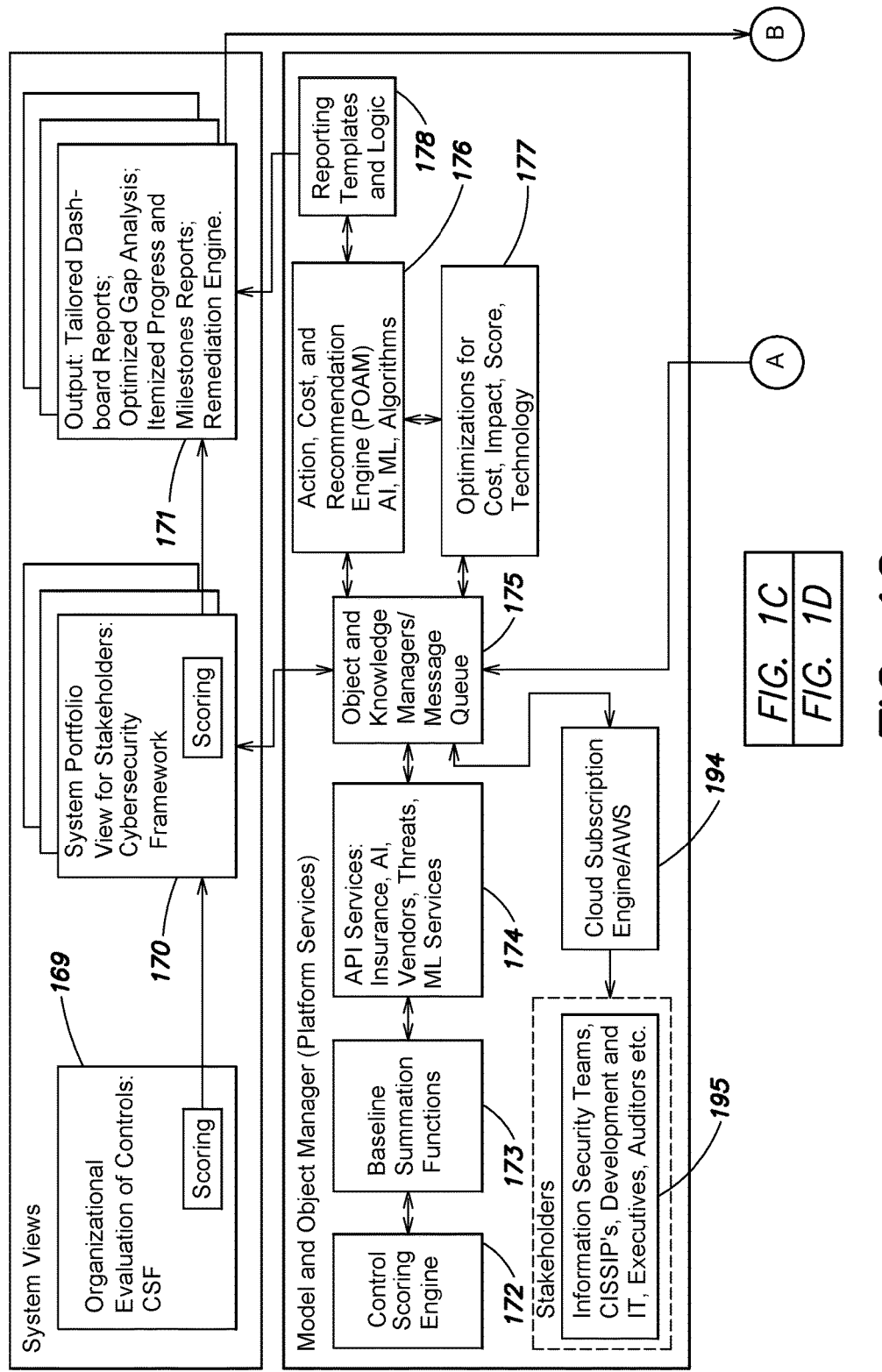

cybersaint  Dashboard  Assessments  Reports  X-force  Optimizations  Settings  User Name  Logout SI-4-4 and Information Integrity Evidence Required:
Remediation Steps:

Supporting Documents — 256

📎 Add a supporting document — 257

SI-4-4 Checklist:                                    Yes    No
HIDS System in place?                                 ☒    ☐
Are Firewall and VPN settings wide open?              ☐    ☒
Have unusual or unauthorized actions been defined?    ☐    ☒
Name of commercial system?  [ IBM ]
                                          258  259
                              260

Control Scores
Please update your scores for this control

Describe your current compliance with this control?
○ N/A
○ Not Compliant
○ Minimally Compliant
○ Partially Compliant
○ Nearly Compliant
○ Fully Compliant Describe your current maturity with this control?

Describe your target compliance with this control?

Describe your target maturity with this control?

FIG. 7

SYSTEM AND METHOD FOR MONITORING AND GRADING A CYBERSECURITY FRAMEWORK

CROSS-REFERENCE TO RELATED APPLICATIONS

The present application claims the benefit of U.S. Provisional Patent Application Ser. No. 62/434,086, which was filed on Dec. 14, 2016, by Padraic O'Reilly for SYSTEM AND METHOD FOR MONITORING AND GRADING A CYBERSECURITY FRAMEWORK, which is hereby incorporated by reference in its entirety.

BACKGROUND

Technical Field

The invention relates generally to cybersecurity, and in particular, to a system and cybersecurity framework configured to suggest and verify one or more particular actions that improve a client computing system's compliance with a cybersecurity standard.

Background Information

Cybersecurity is a growing industry, as computers have become the leading devices for information storage and retrieval. To that end, and to ensure that information and computing systems are secure, compliance organizations have developed different catalogs that provide guidance, in the form of controls, as to how client computing systems should ensure that the information they store and the computing systems that they operate are secure. However, each client has different organizational attributes, desires, and needs such that certain controls may be more applicable than others. Thus, it may be difficult to determine for each client computing system which controls should be improved and the manner in which the controls should be improved such that the client computing system has increased compliance with the controls.

SUMMARY

The inventive cybersecurity system sums and scores one or more cybersecurity controls for different client computing systems that each have different attributes, desires, and needs. In addition, the cybersecurity system provides to each different client computing system auto-suggestions that suggest one or more ways in which the client computing system may improve the confidentiality, integrity, and availability of the information stored on the client computing system and/or improve the confidentiality, integrity, and availability of the underlying characteristics of the client computing system.

Specifically, an authorized individual associated with an organization that operates a client computing system or an auditor may access the cybersecurity system is over a computer network utilizing a computing device (e.g., desktop computer, mobile device, etc.). Particular organizational information associated with the organization may be provided to the cybersecurity system utilizing a user interface, such as a graphical user interface (GUI). In addition, control information associated with one or more cybersecurity controls may also be provided to the cybersecurity system utilizing the user interface. For example, the control information may indicate that the client computing system is in compliance with a particular security control, is not in compliance with the particular security control, is in partial compliance with a particular security control, or that the particular security control is not applicable. The cyber security controls may be defined in a catalog of security controls (e.g., National Institute of Standards and Technology (NIST) 800-53-Rev. 4, ISO/TEC 27000 that is hereby incorporated by reference) for United States federal information systems.

The cybersecurity system may provide, through the user interface, one or more query scripts based on the organizational information, control information, a target state that the client computing system desires to reach with respect to compliance of the particular security control, and/or the gap between the control information and the target state. In response to the query scripts, the authorized individual may provide one or more responses utilizing the user interface. Based on the responses, the cybersecurity system may automatically provide, through the user interface, one or more suggestions for improving the client computing system such that compliance for the particular control improves or reaches the target state. The cybersecurity system may then verify that the client computing system in fact implemented the one or more suggestions and that compliance for the particular control improved and/or reached the target state.

Advantageously, the cybersecurity system that is remotely located from each of the different client computing systems is configured to provide unique suggestions for improving each of the different client computing systems that have different attributes, needs, and interests. In addition, and by utilizing the cybersecurity system, the confidentiality, integrity, and availability associated with the client computing system is improved. Specifically, and by implementing the suggestions provided by the cybersecurity system, the client computing system's overall functionality is improved such that the client computing system is more secure and less susceptible to cyber-attacks, for example. Further, the verification process implemented by the cybersecurity system ensures that the functionality of the client computing system has in fact been modified and improved such that the overall compliance of the client computing system closer to or at the target state desired by the user of the client computing system.

BRIEF DESCRIPTION OF THE DRAWINGS

The description below refers to the accompanying drawings, of which:

FIGS. 1C and 1D are a block diagram of a system overview of the cybersecurity scoring and recommendation system with a self-calibrating, machine learning capability according to one or more embodiments described herein;

FIG. 7 is an exemplary graphical interface associated with providing query scripts according to one or more embodiments described herein.

DETAILED DESCRIPTION OF AN ILLUSTRATIVE

EMBODIMENT

Figure 1A:
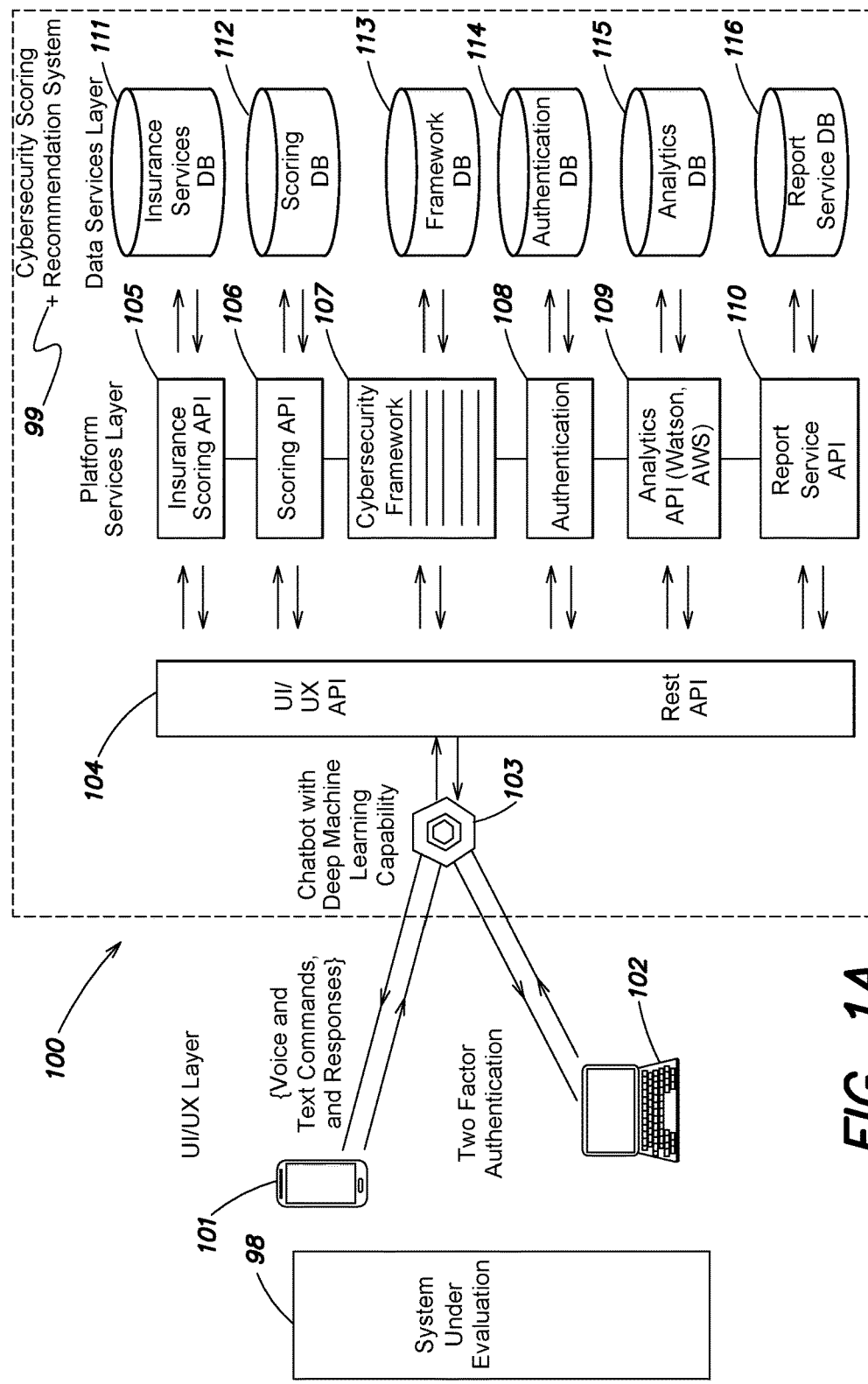
FIG. 1A is a block diagram of an architecture for communication between a cybersecurity scoring and recommendation system and one or more devices associated with one or more embodiments described herein.

FIG. 1A is a schematic block diagram depicting an architecture 100 for the communication between a cybersecurity scoring and recommendation system 99 and one or more devices associated with a system under evaluation 98. FIG. 1A includes a device 101 of an authorized user (e.g., auditor or a user of an organization operating the client computing system). For example, the device 101 may be a cell phone, a laptop, etc., that may execute an application associated with the cybersecurity scoring and recommendation system 99. In addition workstation 102, which may be associated with the authorized user or a different authorized user, executes software associated with the cybersecurity scoring and recommendation system 99. A deep learning chatbot 103 illustratively utilizes automatic speech recognition (ASR) machine learning technology for speech to text, and natural language understanding (NLU) to correct and interpret text. As such, an authorized user, through device 101 and/or workstation 102, may utilize speech to interact with the cybersecurity scoring and recommendation system 99. The system's Rest and User Interface Application Program Interfaces 104 contain the protocols for information exchange between the device 101 and the cybersecurity scoring and recommendation system 99, and the information exchange between the workstation 102 and the cybersecurity scoring and recommendation system 99.

An insurance scoring application program interface (API) 105 permits an authorized user, through device 101 and/or workstation 102, to access anonymized compliance scores within industry sectors. For example, different industry sectors may have different risk profiles. Some sectors, such as healthcare, may be concerned with integrity, while financial services may be more concerned with data loss and/or confidentiality. Therefore, the cybersecurity scoring and recommendation system 99 may allow an organization to compare its system risk profile and/or posture (e.g., current state) against other organization profiles in their sector or other sectors. The scoring API 106 allows an auditor or authorized user, through device 101 and/or workstation 102, to score and track assessments within the cybersecurity scoring and recommendation system 99. NIST's Cybersecurity Framework (NIST's CSF) 107 represents the central control framework utilized by the cybersecurity scoring and recommendation system 99 to perform one or more of the functions as described herein. Although reference is made to the NIST CSF, it is expressly contemplated that the cybersecurity scoring and recommendation system 99 may utilize any of a variety of different frameworks to perform one or more of the functions as described herein.

The Authentication API 108 tracks and gives permissions to authorized users and auditors accessing the cybersecurity scoring and recommendation system 99 utilizing device 101 and/or workstation 102. The analytics API 109 comprises several service handling optimizations within the cybersecurity scoring and recommendation system 99. The report service API 110 handles data and requests received from authorized users through the device 101 and/or the device 102. In addition, the report service API 110 provides reports, graphics, and/or optimizations based upon scores, historical data, and metadata within assessments to the authorized users through device 101 and/or device 102. Databases 111-116 store data for each service within the cybersecurity scoring and is recommendation system 99. Although reference is made to databases 111-116 storing data for each service within the cybersecurity scoring and recommendation system 99, it is expressly contemplated that any of a variety of different storage devices may store data for each service. For example, the storage devices may include, but are not limited to, hard disk drives (HDDs) and solid-state drives (SSDs).

Figure 1B:
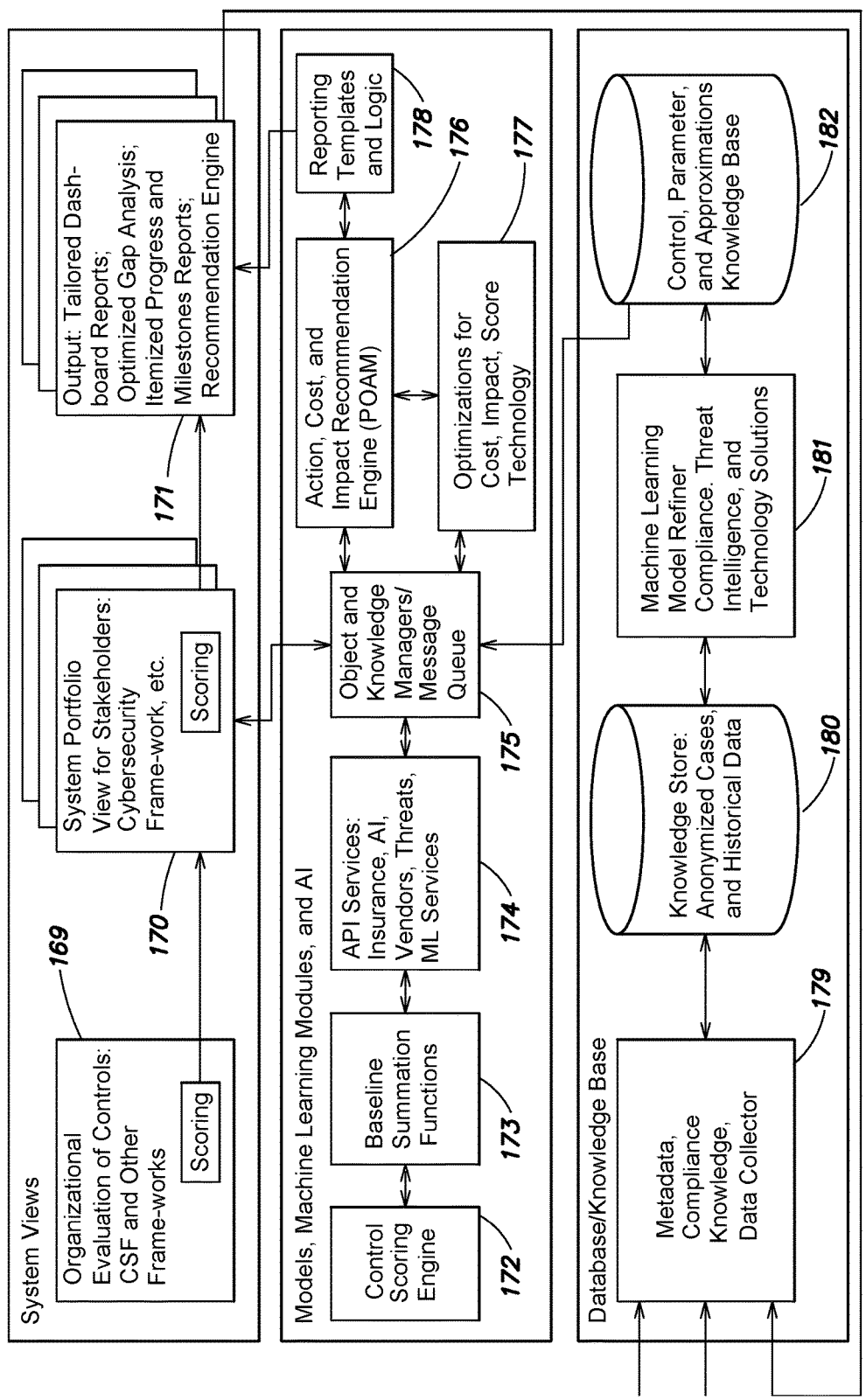
FIG. 1B is a block diagram of a system overview of the cybersecurity scoring and recommendation system according to one or more embodiments described herein.

FIG. 1B is a block diagram of a system overview of the cybersecurity scoring and recommendation system 99 according to one or more embodiments described herein. The cybersecurity scoring and recommendation system's scoring framework 169 supports the assessment, scoring, and optimizations of a system under evaluation 98 by the cybersecurity scoring and recommendation system 99. The cybersecurity scoring and recommendation system 99 utilizes a portfolio view 170 for authorized users and auditors to extend the assessment capability to multiple environments according to one or more embodiment described herein. For example, the environments may include, but are not limited to, a datacenter, a payment system, a warehouse, and/or a separate corporate facility. After an authorized user begins scoring an assessment for the system under evaluation 98, the cybersecurity scoring and recommendation system 99 provides multiple reporting functions, query scripts, recommendations, and/or optimizations 171, as described in further detail below. In addition, one or more user interfaces may permit dynamic updates to the system under evaluation 98 and tracking within the cybersecurity scoring and recommendation system 99. For example, tracking provides a time-stamped view of compliance progress of the system under evaluation 98. As such, the authorized user may view the score of the system 98 as it moves from the current state to the target state, as will be described in further detail below. For example, the authorized user may view the compliance progress over a week, month, a year, etc.

The cybersecurity scoring and recommendation system 99 utilizes a control scoring system 172 that supports one or more algorithms, models, and optimizations. For example, the cybersecurity scoring and recommendation system 99 may utilize one or more mathematical algorithms to perform summations 173 which provide data to other quantitative services to assist in assessing the system under evaluation 98 according to one or more embodiments described herein. The cybersecurity scoring and recommendation system 99 utilizes one or more API services 174 to support the improvement of the confidentiality, integrity, and/or availability of information for the system under evaluation 98. Object and knowledge managers illustratively operate through a message queue 175 to control the scoring, user interfaces, models, optimizations, reporting, query scripts, machine learning, and/or artificial intelligence applications within the cybersecurity scoring and recommendation system 99.

The recommendation engine 176 utilizes enriched data from system applications to provide guidance to the user or auditor with respect to improving the confidentiality, integrity, and availability of information for the system under evaluation 98. An authorized user provides data, such as, but not limited to, historical, market, and/or metadata that is utilized to produce cost-benefit, risk-based, and Pareto Efficient tradeoff space optimizations 177 that may be then provided to authorized users and auditors through the device 101 and/or workstation 102. As known by those skilled in the art, Pareto efficiency or Pareto optimality is a state of allocation of resources from which it is impossible to reallocate so as to make any one individual or preference criterion better off without making at least one individual or preference criterion worse off.

Reporting templates and logic 178 supports the data services the cybersecurity scoring and recommendation system 99 utilizes to improve the confidentiality, integrity, and availability of information of the system under evaluation 98. Specifically, the reporting templates and logic 178 allow user to generate reports that summarize the compliance of the system 98, in a graphical form, for example, to other individuals, such as stakeholders. That is, the generated reports allow users to obtain a more accurate picture of the compliance of the system 98 at various points, such as at the beginning of evaluation, after updates have been made to improve compliance, and continuously thereafter, as the system 98 updates in real-time. Metadata 179 on user behavior, scoring, user management, company profile, and market solutions may be collected, stored, and employed by services within the cybersecurity scoring and recommendation system 99 to assist in improving the system's compliance towards the target state. Knowledge is collected, anonymized, and stored 180 for use by system services within the cybersecurity scoring and recommendation system 99. Machine learning modules, is decision models, artificial intelligence services, threat models, and data on technology solutions 181 are stored for use by services within the cybersecurity scoring and recommendation system 99. Multiple frameworks and parameters 182 for models are stored for utilization by services within the cybersecurity scoring and recommendation system 99.

Figure 1D:
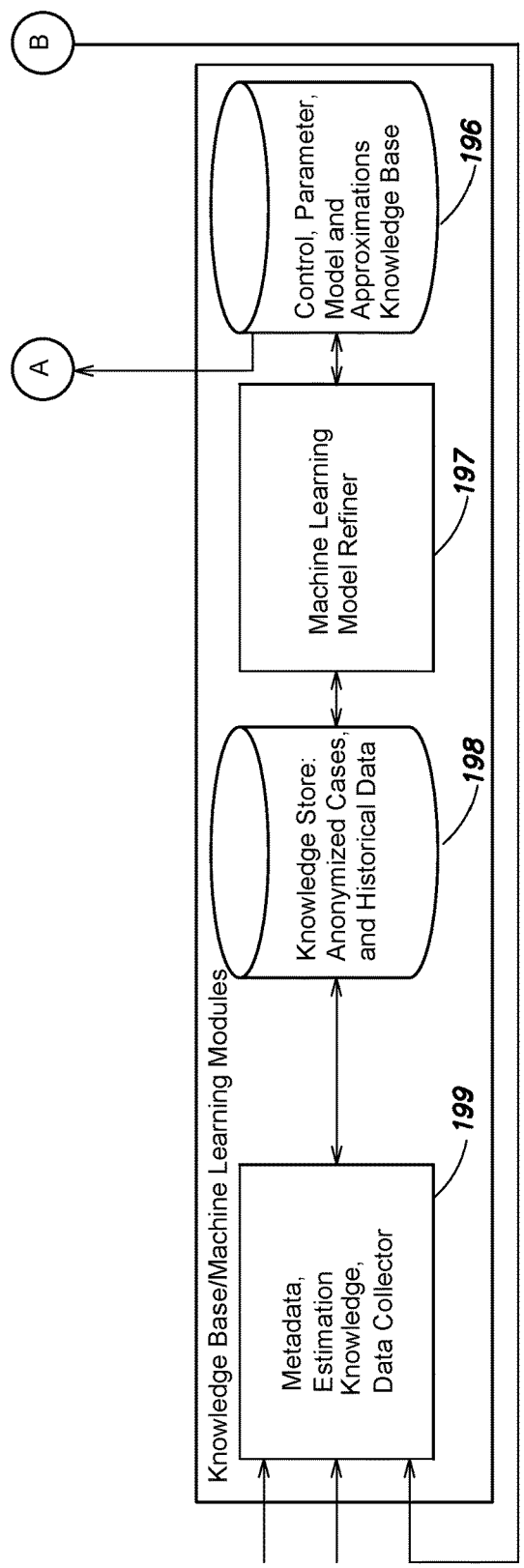

FIGS. 1C and 1D are a block diagram of a system overview of the cybersecurity scoring and recommendation system with a self-calibrating, machine learning capability (user populating fields of a user interface) according to one or more embodiments described herein. The graphic is similar to 1B, but depicts cloud integration 194 of the cybersecurity scoring and recommendation system 99 that allows stakeholders 195 to access the application remotely and without requiring software, server infrastructure, and database storage on site. As known by those skilled in the art, cloud integration is the process of configuring multiple application programs to share data in the cloud. In a network that incorporates cloud integration, diverse applications communicate either directly or through third-party software.

Figure 1E:
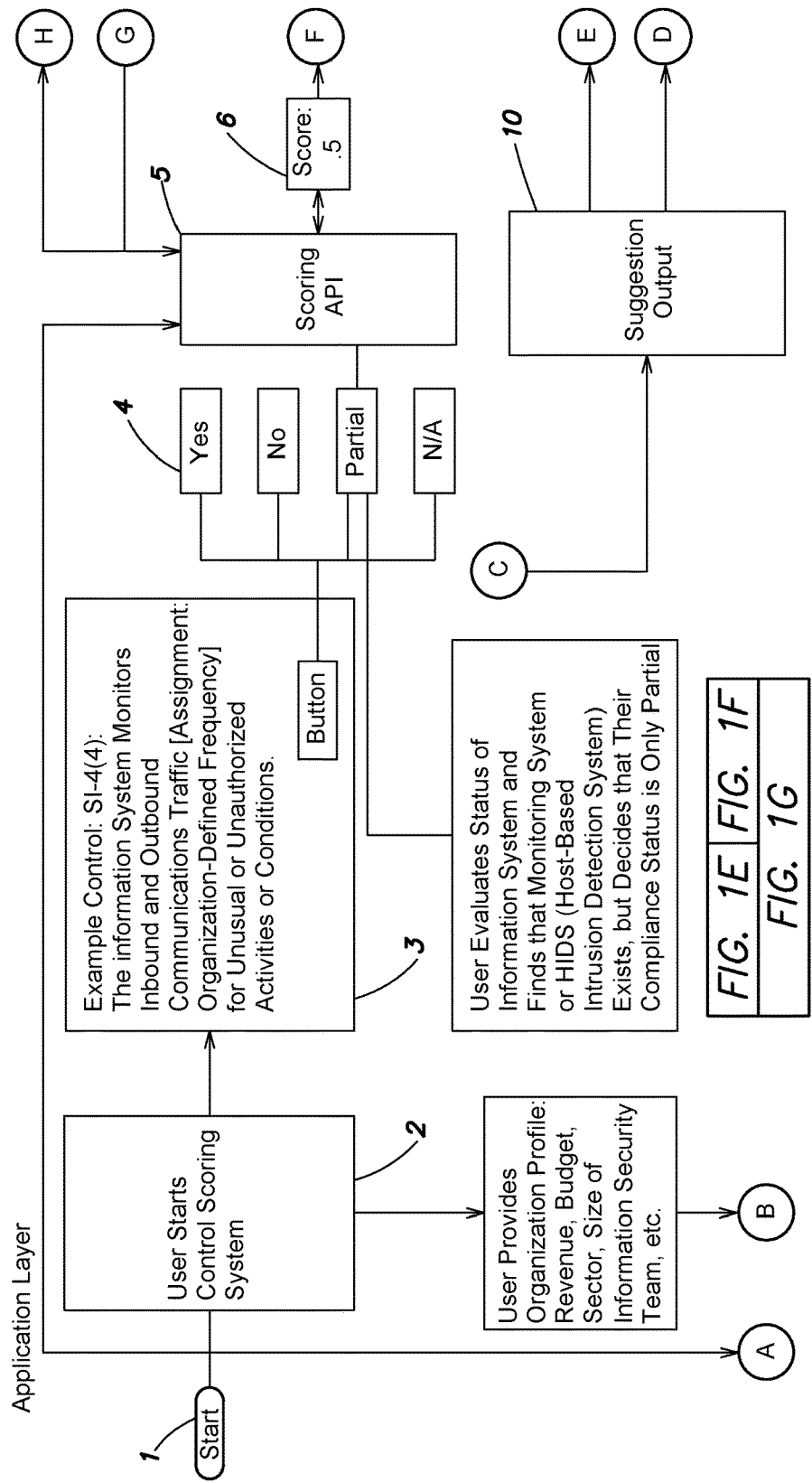
FIGS. 1E-1G are a flow chart for the operation of the cybersecurity scoring and recommendation system according to one or more embodiments described herein.
Figure 1F:
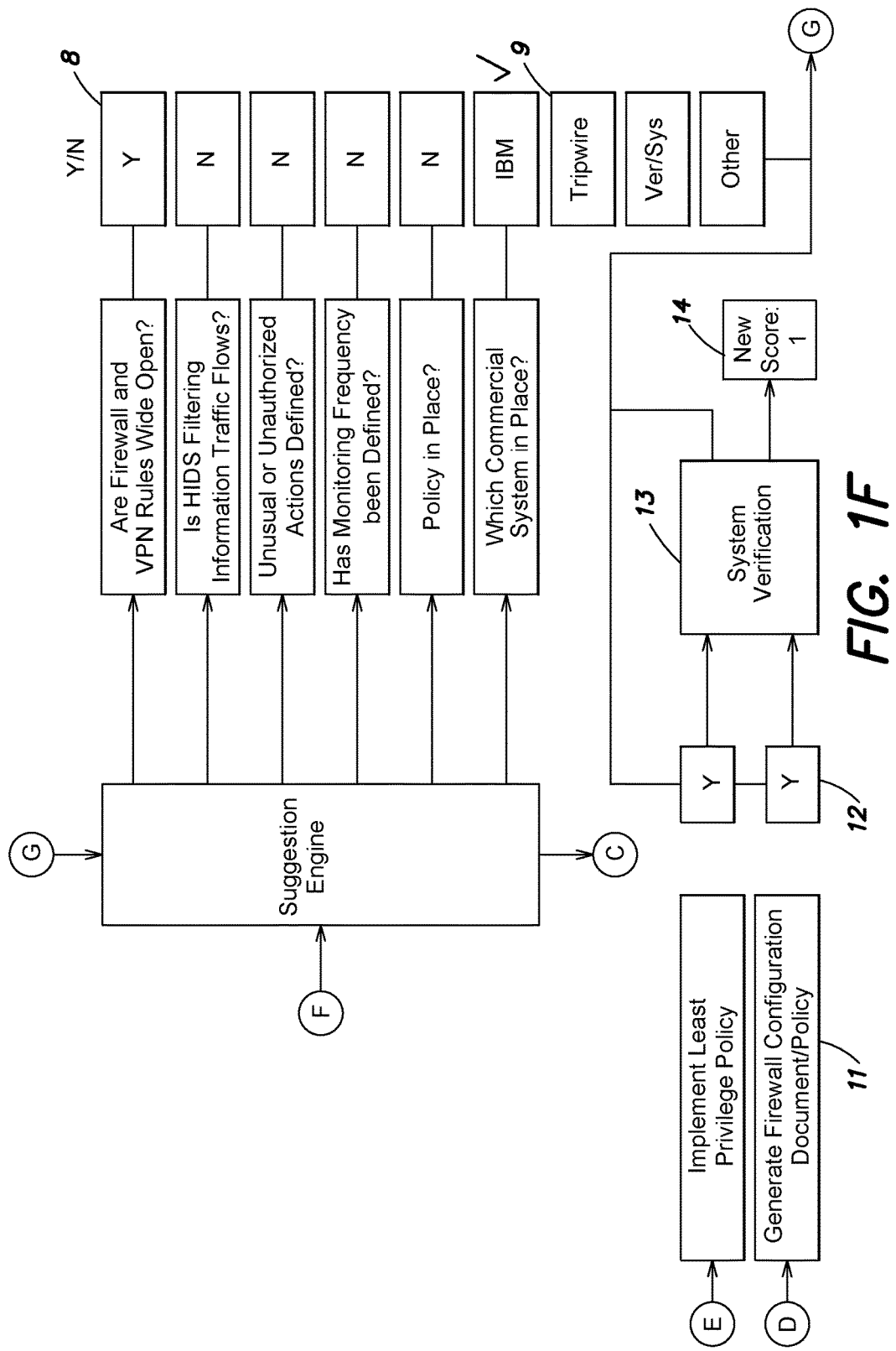
Figure 1G:
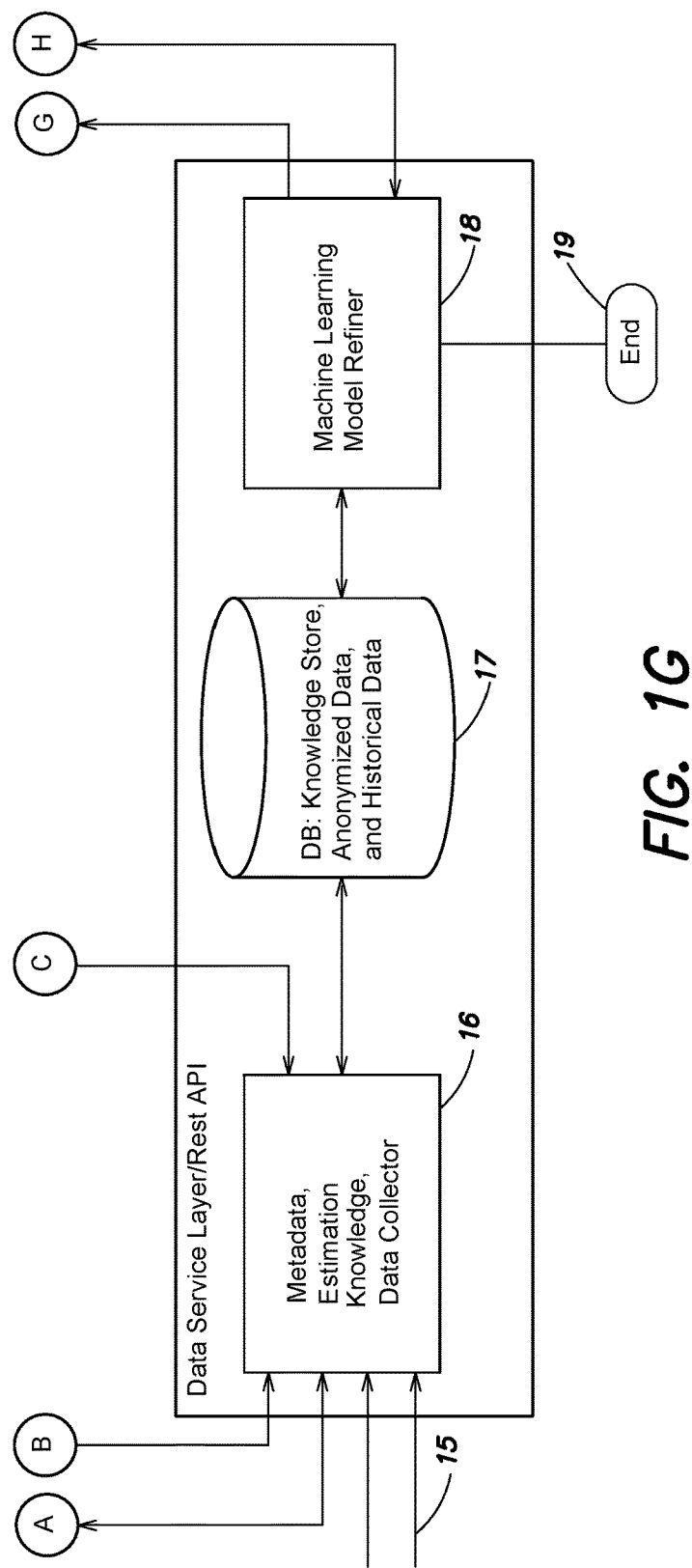

FIGS. 1E-1G are a flow chart for the operation of the cybersecurity scoring and recommendation system according to one or more embodiments described herein. The procedure starts at step 1 and continues to step 2 where an authorized user (e.g., an information security professional or auditor) instantiates a scoring session utilizing an application associated with the cybersecurity scoring and recommendation system 99, executing on device 101 and/or workstation 102. Specifically, the authorized user may "log-in," as known by those skilled in the art, and begin an assessment for the system to be evaluated 98. The procedure continues to step 3 where the authorized user selects one or more cybersecurity controls, from a catalog, for evaluation. For example, the authorized user may select SI-4 (4), which is a System and Information Integrity control from NIST 800-53, Rev. 4, which is hereby incorporated by reference, and is associated with inbound and outbound communication traffic for unusual or unauthorized activities and/or conditions. In this example, SI-4 (4) represents one of 24 control enhancements to the parent control, SI-4, Information System Monitoring. In addition, the user may provide, through one or more UIs, profile information associated with the system 98 and/or organization. For example, the profile information may include, but is not limited to, revenue of the organization, budget for the organization, sector of the organization, and/or number of Information Security Professionals employed at the organization.

The procedure continues to step 4 where the authorized user selects, using the device 101 and/or workstation 102, a particular value for each of the one or more cybersecurity controls being evaluated. For example, the authorized user may select from one of four fields, (Yes, No, Partial, N/A), to represent the system's current compliance with respect to a particular cybersecurity control. For example, after evaluating the system's current posture (e.g., current state), the user respectively selects compliant (e.g., Yes), non-compliant (e.g., No), partially compliant (e.g., Partial), or non-applicable (e.g., NA) for the particular cybersecurity control, SI-4 (4). For example, the third requirement for this cybersecurity control may be for a Host-Based Intrusion Detection System (HIDS). The user may determine that the system has a HIDS in place, but that use of the HIDS system is only partially compliant given the control requirements language in the catalog, and thus select "Partial."

The procedure continues to step 5 where the scoring Application Program Interface (API) scores and records the data to appropriately asses the current state of the system 98. For example, a score of "1" may represent compliant, a score of "0" may represent non-compliant, a score of 0.5 may represent partial, and N/A may represent not-applicable. The overall score, that may represent the collective score for SI-4 (4) for the cybersecurity control being evaluated, may be expressed as a number or percentage according to one or more embodiments described herein. For this example, the overall score may be a 0.5 representing the system's current state for SI-4 (4). The cybersecurity scoring and recommendation system 99 may then record the individual scores and/or overall score.

The procedure continues to step 6 where the cybersecurity scoring and recommendation system 99 transmits the individual scores and/or overall score to the device 101 and/or workstation 102 to be displayed to the authorized user. Each individual score may be referred to as a "Baseline Score" for a particular control, and the overall score may also be referred to as a "Baseline Score" for the entire system under evaluation. The Baseline Score may also be made available to the reporting templates such that an authorized user may generate one or more reports associated with the current state of the system. The reports may then be provided to other individuals associated with the organization, such as, but not limited to organizational stakeholders.

After the Baseline Score(s) are determined, a target state for improvement of the system under evaluation 98 is determined. For example, the authorized user may view the current overall Baseline Score of the system and determine that the target state should be a 1. The numerical difference between the Baseline Score and the target state is called the "Gap." The Gap in this example is 0.5 since the current score is 0.5 and the target score is 1.

The procedure continues to step 7 where the suggestion engine may then utilize the Baseline Score(s) to generate query scripts based upon organizational data, utility, and compliance requirements. Specifically, the suggestion engine generates a series of questions (cognitive scripts) concerning compliance status in order to identify where the system under evaluation 98 stands at a more granular level with respect to the cybersecurity controls. For example, the query scripts may include, but are not limited to, are firewalls and VPN rules wide open, is HIDS filtering information traffic flows, are unusual or unauthorized actions defined, has monitoring frequency been defined, is there a policy in place, and/or which commercial system is in place. In an embodiment, each individual Baseline Score may be associated with different scripts. The query scripts are designed to elicit correct information regarding the system under evaluation 98 such that the cybersecurity scoring and recommendation system 99 may evaluate progress from the current state toward the target state to ensure that correction suggestions are provided by the suggestion engine.

The procedure continues to step 8 where the authorized user may provide responses to the query script provided by the suggestion engine. For example, the authorized user may provide Yes/No response utilizing one or more user interfaces. Alternatively, the authorized user may provide other types of responses. The cybersecurity scoring and recommendation system 99 may then record the authorized user's responses.

In an embodiment the procedure continues to step 9 where the cybersecurity scoring and recommendation system 99 may provide additional queries. For example, and with reference to FIG. 1F, the cybersecurity scoring and recommendation system 99 provides a query, based on a partial response provided by the user for the HIDS control, regarding which commercial system is in place (e.g., IBM, Tripwire, Verisys, or other) in the system under evaluation. Had the user instead provided a value of non-compliant instead of partial, the suggestion engine may have then provided the authorized user a set of commercial solutions in a vendor-neutral manner instead of providing the additional query. In the example provided in FIG. 1F however, the user provided a response of partial compliance, and as such each vendor system in place (e.g., IBM, Tripwire, Verisys, or other) might have different capabilities that could lead to a simple and efficient acquisition of the target state. The check mark, as depicted next to a particular vendor, confirms that an authorized user verified that this particular commercial solution is in place. The cybersecurity scoring and recommendation system 99 enriches commercial solutions data with metadata on all available commercial solutions, and may factor the various capabilities into further scripts and suggestions.

After an authorized user provides the relevant information to the query scripts, the procedure continues to step 10 where the suggestion engine determines one or more suggestions for improving the system 98 from the current state towards the target state based on at least the response to the queries and the current state. In addition, the one or more suggestions may be further based on the target state, the gap, historical data, and/or other information.

The procedure continues to step 11 where the one or more suggestions are provided over the network to the device 101 and/or workstation 102 to be viewed by the authorized user. With reference to the example of FIG. 1F, the suggestions may be, but are not limited to, implementing least privilege policy and generating firewall configuration document/policy. For example, a particular suggestion may be provided by the cybersecurity scoring and recommendation system 99 based on the current state of the system 98 and/or answers provided to the query scripts. Specifically, the cybersecurity scoring and recommendation system 99 may store data that indicates that if a system under evaluation 98 has a particular posture for a control (e.g., 0, 0.5, or 1) and provides a particular answer to one or more query scripts, then the cybersecurity scoring and recommendation system 99 should provide one or more particular suggestions.

The suggestions are provided by the cybersecurity scoring and recommendation system 99 to assist in moving the system under evaluation 98 from the current state towards the target state. The pointed suggestions represent the distilled knowledge of the system under evaluation 98, which are generated by using pattern recognition and machine learning upon the set of query scripts, as described above with reference to step 7, tailored for the set of all possible compliance states for the system under evaluation 98. The query scripts, in turn, are improved and enhanced by the cybersecurity scoring and recommendation system 99 at the data services layer. Additionally, the organization, during the process of the system 98 moving from the current state to the target state, may upload documents, artifacts, and notes to a system-wide document store for reference and analysis by team members. The cybersecurity scoring and recommendation system 99 may then capture information from this data, in order to model utility functions, and provide tailored strategies for improving compliance.

The procedure continues to step 12 where the authorized user provides input indicating whether the one or more suggestions have been implemented by the system 98. For example, the authorized user may utilize device 101 or workstation 102 to provide the response. That is, a user interface may ask the authorized user if each of the one or more suggestions have been implemented to move the system 98 from the current state to the target state, and the user may respond with either "Yes" or "No."

The procedure continues to step 13 where the verification system, of the cybersecurity scoring and recommendation system 99, verifies/confirms that the one or more suggestions have been implemented. In an embodiment, (for a non-technical control such as Access Control Policy and Procedures) the verification process may be based on the input provided by the authorized user indicating whether the one or more suggestions have been implemented. In an alternative embodiment, the cybersecurity is scoring and recommendation system 99 may query the system 98, through the device 101 and/or workstation 102, to determine if one or more setting have been changed, wherein the one or more settings are associated with the one or more suggestions. This data regarding implementation may also be utilized to further refine the suggestions provided suggestion engine, and further conditions the industry/sector specific dataset.

The procedure continues to step 14 where the cybersecurity scoring and recommendation system 99 displays a new score based on the verification process. With reference to the example of FIG. 1F, the authorized user has indicated that both suggestions provided by the suggestion engine were implemented. The cybersecurity scoring and recommendation system 99 may then provide over the network and to the device 101 and/or workstation 102, the new score that represents the new posture of the system under evaluated 98 with respect to the cybersecurity controls. With reference to the example of FIG. 1F, the cybersecurity scoring and recommendation system 99 may indicate that the new score is "1." As such, and in this example, the system under evaluation 98 has reached the target state.

The particular example with respect to FIG. 1E-1G is simply for illustratively purposes only, and any of a variety of suggestions and/or implementations may be provided to move the system under evaluation 98 from the current state towards the target state, to improve the cybersecurity of the system under evaluation 98. Determining the target state, providing the one or more suggestions, and verifying that the system has implemented the one or more suggestions represents a clear improvement to the confidentiality, integrity, and availability of the computer/system (e.g., improvement to an existing technology and improvement to the computer itself). In addition, the new score may be utilized to generate one or more reports, as described above.

In an embodiment, the procedure continues to step 15 where data may be collected from external sources on industries, threat probabilities, products, and addition control information, etc. to continuously refine the cybersecurity scoring and recommendation system's models. In an embodiment, the procedure continues to step 16 where a metadata database collects compliance related data activity from the authorized user. For example, the metadata database may collect threat data from any of a variety of different public feeds, such as, but not limited to, The National Vulnerability Database (NVD), IBM X-Force, US-Cert, BugTraq, etc. In addition, the metadata database may collect public data on outcomes, such as, but not limited to, breaches, cybercrime, DDoS attacks, etc.

Further, the metadata database may collect publicly available data on compliance by sector, enterprise size, and legacy system use; data on remediation, time to detection of cyber-events, cost of data loss, etc. Even further, the metadata database may collect public available data on other control frameworks, such as, but not limited to CSC 20, NIST-IR, NY State DFS Section 500.00, IEC 62443, ISO 27000, COBIT 5, etc.

In an embodiment, the procedure continues to step 17 where the knowledge store database 179 stores data in a relational system for the decision models, the machine learning module, and other system applications, wherein the data may be stored in tabular or relational database management system (RDMS) form, as known by those skilled in the art. In an embodiment, the procedure continues to step 18 where the machine learning module uses pattern recognition and "deep learning" to refactor the decision models that supply the suggestion engine with queries and suggestions, as described above. The module may also leverage custom decision logic or commercial off the shelf decision logic such as but not limited to artificial intelligence, machine learning, fuzzy logic or neural networks to create suggestions according to one or more embodiments as described herein. The procedure ends at step 19.

Figure 2A:
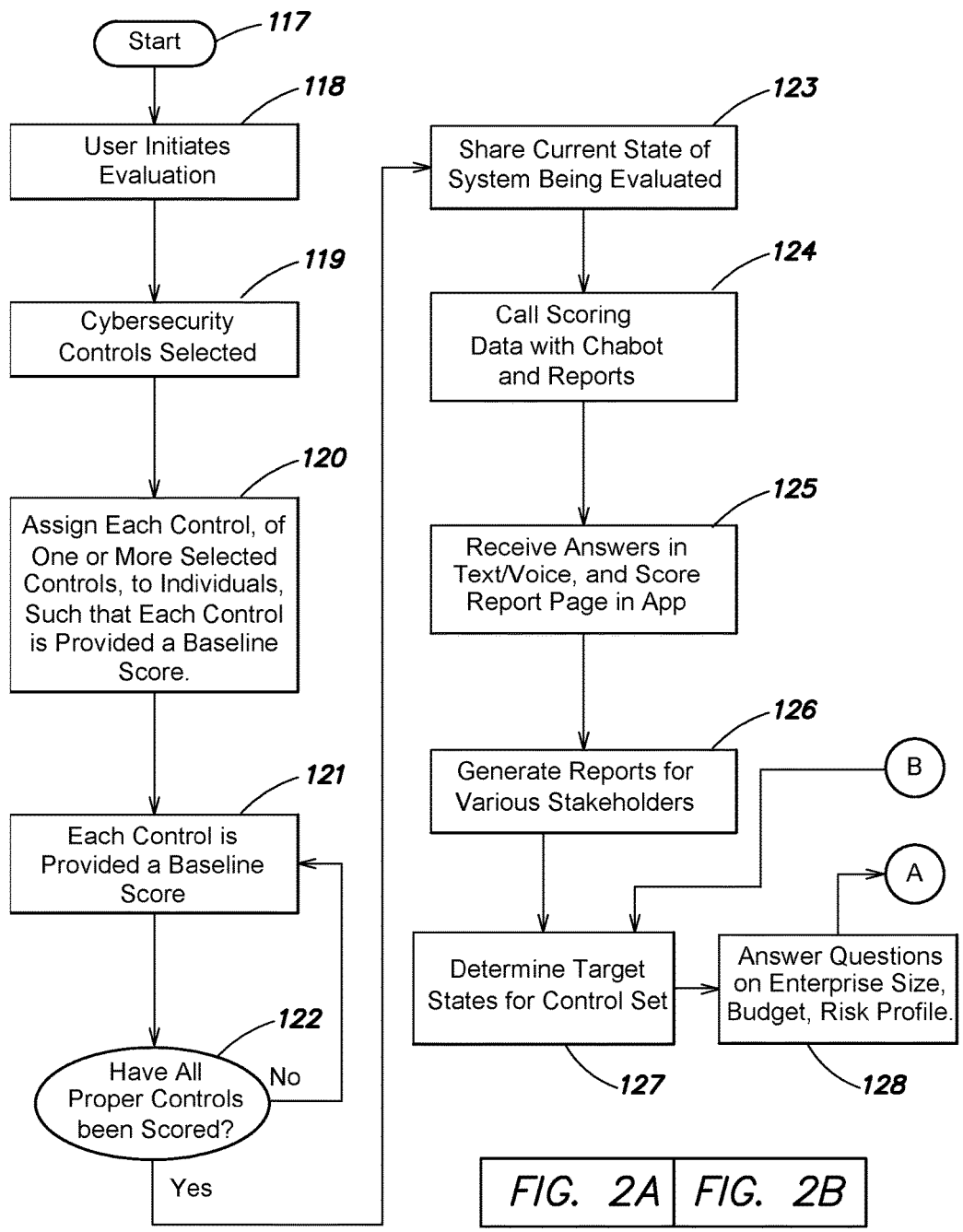
FIGS. 2A and 2B are a flow chart from the viewpoint of an authorized user who is utilizing the cybersecurity scoring and recommendation system according to one or more embodiments described herein.
Figure 2B:
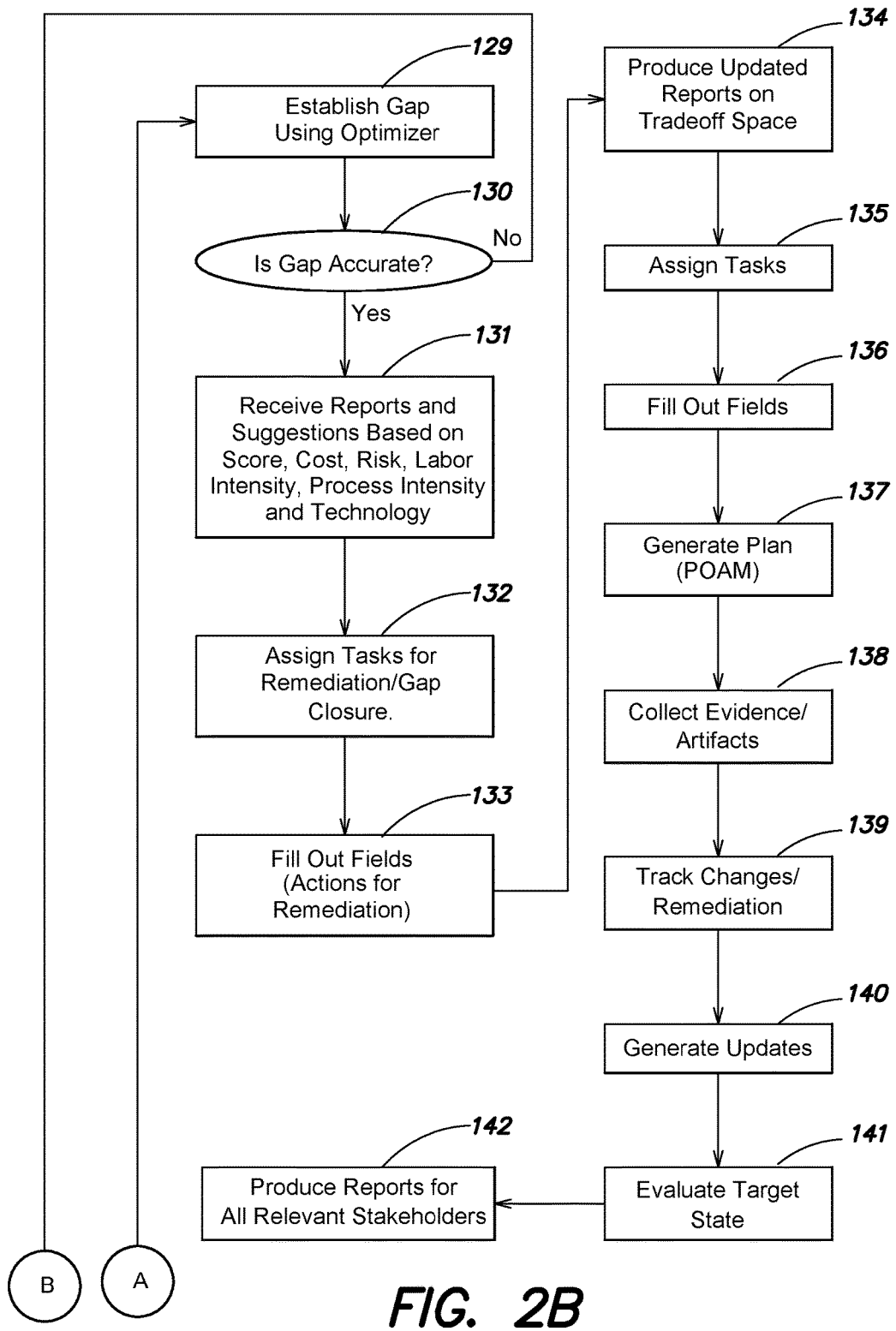

FIGS. 2A and 2B are a flow chart from the viewpoint of an authorized user who is utilizing the cybersecurity scoring and recommendation system according to one or more embodiments described herein. The procedure starts at step 117 and continues to step 118 where an authorized user initiates the evaluation of a system 98 utilizing the cybersecurity scoring and recommendation system 99. Specifically, the authorized user logs-in, utilizing device 101 and/or workstation 102, to a portal or website to obtain access to the cybersecurity scoring and recommendation system 99.

The procedure continues to step 119 where the authorized utilizes one or more user interfaces to select one or more cybersecurity controls that are to be utilized in evaluating the system 98. The procedure continues to step 120 where the authorized user assigns each control, of the one or more selected controls, to one or more other individuals (e.g., other authorized users or auditors) such that each control can be provided a baseline score. For example, the authorized user may utilize the device 101 and/or workstation 102 to notify each of the other individuals that a control is to be scored. Specifically, each of other individuals may receive an email or other notification indicating that the other individual is responsible for scoring a particular control.

The procedure continues to step 121 where each control is provided a baseline score. Specifically, the assigned other individual utilizes a device to provide a baseline score to the control for the system under evaluation 98. For example, the baseline score may be compliant (e.g., 1), non-compliant (e.g., 0), partially compliant (e.g., 0.5), or not-applicable (e.g., N/A). In addition, the assigned individual may also provide current compliance information and an ideal target that the individual believes the system under evaluation 98 should adhere to. It is noted that the cybersecurity scoring and recommendation system 99 may convert each of the baseline scores to a number between 0-100 and/or a percentage. In addition, the cybersecurity scoring and recommendation system 99 may also provide an overall baseline score, between 0-100 and/or a percentage, for the system under evaluation 98 and the score may be continuously updated as more individual baseline scores are received. In addition, the authorized user may provide answers to queries provided by the cybersecurity scoring and recommendation system 99, wherein the queries are associated with the completeness and applicability of the selected controls utilized for the evaluation.

The procedure continues to step 122 where the cybersecurity scoring and recommendation system 99 determines if all the selected cybersecurity controls have been scored. If, at step 122, it is determined that all of the selected cybersecurity controls have not been scored, the system reverts back to step 121 where cybersecurity scoring and recommendation system 99 waits to receive the baseline scores for the cybersecurity controls that have not been scored.

If, at step 122, it is determined that all of the selected cybersecurity controls have been scored, the procedure continues to step 123 where an authorized user may share the current state (e.g., posture) of the system under evaluation 98 with one or more other users. For example, the authorized user (e.g., superuser or auditor) may share a dashboard view, which graphically depicts the current state of the system 98, with appropriate stakeholders, wherein the dashboard view contains system-provided metrics and graphics for the assessment of the system under evaluation 98. The procedure continues to step 124 where the authorized user may call for scoring data and reports through a voice-command enabled chatbot that utilizes automatic speech recognition (ASR) and natural language understanding (NLU) to correct and interpret text, according to one or more embodiments described herein.

In response to calling for scoring data in step 124, the procedure continues to step 125 where the authorized user may receive updates and scoring data from the cybersecurity scoring and recommendation system 99 through the voice-command enabled chatbot. For example, the authorized user may receive information updates on control scoring, updates on particular documents or compliance related notes, wherein the updates may be dated and time-stamped.

The procedure continues to step 126 where the authorized user may generate customized reports for stakeholders such as information security teams, risk officers, executives, and board members, utilizing the report service as described above and according to one or more embodiments described herein. Specifically, the authorized user may utilize device 101 and/or workstation 102 to send one or more commands to the cybersecurity scoring and recommendation system 99 such that the cybersecurity scoring and recommendation system 99 generates the report that is customized based on the authorized user's needs.

The procedure continues to step 127 where the authorized user establishes (e.g., determines) and/or updates a compliance target state. For example, the authorized user may utilize the baseline score(s) to determine the target state for the system under evaluation 98 as described above with reference to FIGS. 1E-1G. The procedure continues to step 128 where the authorized user answers questions provided by the cybersecurity scoring and recommendation system, wherein the questions may include, but are not limited to, enterprise size, budget, and risk profile (e.g., metadata regarding the organization). The answers are provided to enhance metrics, recommendations, and optimizations that are output by the cybersecurity scoring and recommendation system 99.

The procedure continues to step 129 where the Gap is established. Specifically, the cybersecurity scoring and recommendation system 99 establishes the Gap based on the current state of the system under evaluation 98 and the target state of the system under evaluation 98. The procedure continues to step 130 where the authorized user determines if the Gap is accurate. Specifically, the authorized user evaluates the Gap, representing the target state of the system under evaluation 98 versus the current state of the system under evaluation 98, to determine whether the Gap can be remediated and closed such that the system under evaluation 98 can move from the current state towards the target state. If at step 130 it is determined that the Gap is not accurate, the procedure reverts back to step 127 where a new target state may be determined.

If at step 130 it is determined that the Gap is accurate, the procedure continues to step 131 where the cybersecurity scoring and recommendation system 98 provides, to the authorized user, one or more recommendations for mitigating the Gap, which will improve the confidentiality, availability, and integrity of system under evaluation 98. For example, a particular suggestion may be provided by the cybersecurity scoring and recommendation system 99 based on the current state of the system under evaluation 98 and/or answers provided to the questions. Specifically, the cybersecurity scoring and recommendation system 99 may store data that indicates that if a system under evaluation 98 has a particular posture for a control (e.g., 0, 0.5, or 1) and provides a particular answer to one or more query scripts, then the cybersecurity scoring and recommendation system 99 should provide one or more particular suggestions to move the system under evaluation 98 from the current state towards the target state.

The procedure continues to step 132 where the authorized user assigns tasks to other authorized users, thereby beginning the process of implementing the recommendations to close the Gap. Specifically, the authorized user may utilize device 101 and/or workstation 102 to send one or more notifications to the other authorized users regarding the tasks to be completed to close the Gap. The procedure continues to step 133 where the authorized user answers query scripts provided by the cybersecurity scoring and recommendation system 99. It is noted that cybersecurity scoring and recommendation system 99 may provide the query scripts to the authorized user prior to providing the suggestions at step 131 in similar manner as described above with reference to FIGS. 1E-1G. In addition, the authorized user may provide remediation data to the cybersecurity scoring and recommendation system 99. Remediation data may include, but is not limited to, purchasing or activating commercial solutions, writing a policy, instantiating an incident response plan, etc. The procedure continues to step 134 where one or more new reports are created based on the implementation of the one or more suggestions and the one or more new reports are provided to the authorized user.

The procedure continues to steps 135-137 where the system under evaluation 98 may repeatedly or continuously update the system under evaluation 98 in the manner described above. Specifically, the suggestions are provided, tasks assigned, a Plan of Action and Recommendations (POAM) is determined, and query scripts are provided to continuously improve the confidentiality, integrity, and availability of the assessed system under evaluation 98 according to one or more embodiment described herein. The procedure continues to step 138 where artifacts and evidence are collected. Specifically, the artifacts and evidence may be provided by the authorized user to the cybersecurity scoring and recommendation system 99, wherein the artifacts and evidence indicate what suggestions and/or updates have been implemented by the system under evaluation 98 to improve the cybersecurity of the system under evaluation 98. For example, the authorized user may utilize device 101 and/or workstation 102 to provide the artifacts and evidence to the cybersecurity scoring and recommendation system 99.

The procedure continues to step 139 where the changes/remediation may be tracked. For example, the cybersecurity scoring and recommendation system 99 may query the system under evaluation 98 to determine if the suggestions and/or updates have been made to the system under evaluation 98. Based on the tracking of the changes/remediation, the procedure continues to step 140 where the cybersecurity scoring and recommendation system 99 may generate different updates to be implemented by the system under evaluation 98 to further improve cybersecurity. The procedure then continues to step 141 where the target state or new state of the system under evaluation 98 is evaluated. For example, the cybersecurity scoring and recommendation system may provide, to the device 101 and/or workstation 102, a new score representing the new posture of the system under evaluation 98 after the cybersecurity of the system has been updated.

The procedure continues to step 142 where the authorized user produces reports, based on the new score of the system under evaluation 98, for relevant stakeholders utilizing the cybersecurity scoring and recommendation system 99. The reports may include, but are not limited to, graphics, scores, and recommendations for information security team members, risk officers, executives, and board members according to an embodiment of the cybersecurity scoring and recommendation system 99.

Figure 3A:
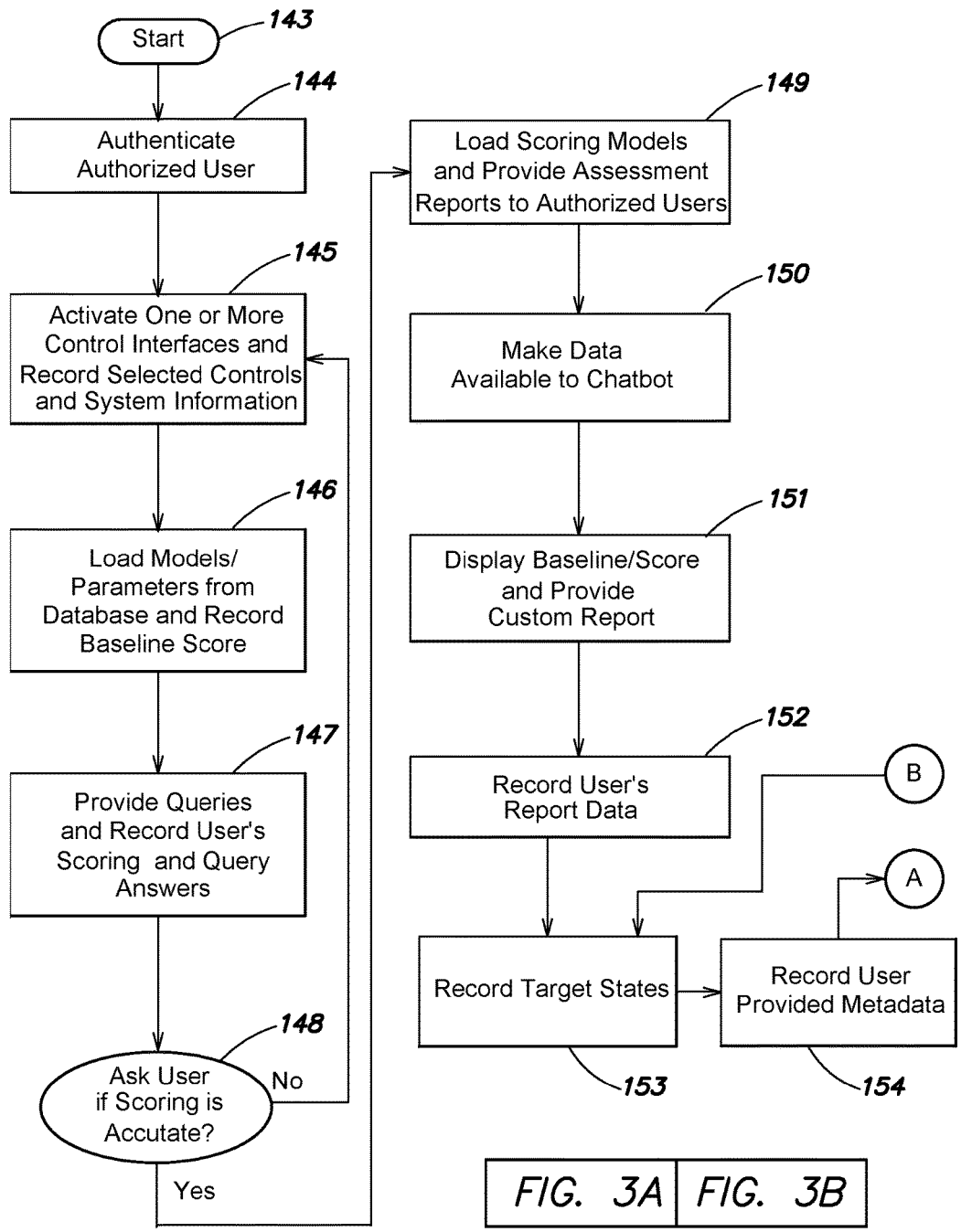
FIGS. 3A and 3B are a flow chart for the operation of the system from a perspective of the cybersecurity system interacting with a user to allow a user to generate a baseline score for a control of an organization operating a client computing system, and thereafter establish a target state and gap to provide suggestions according to one or more embodiments described herein.
Figure 3B:
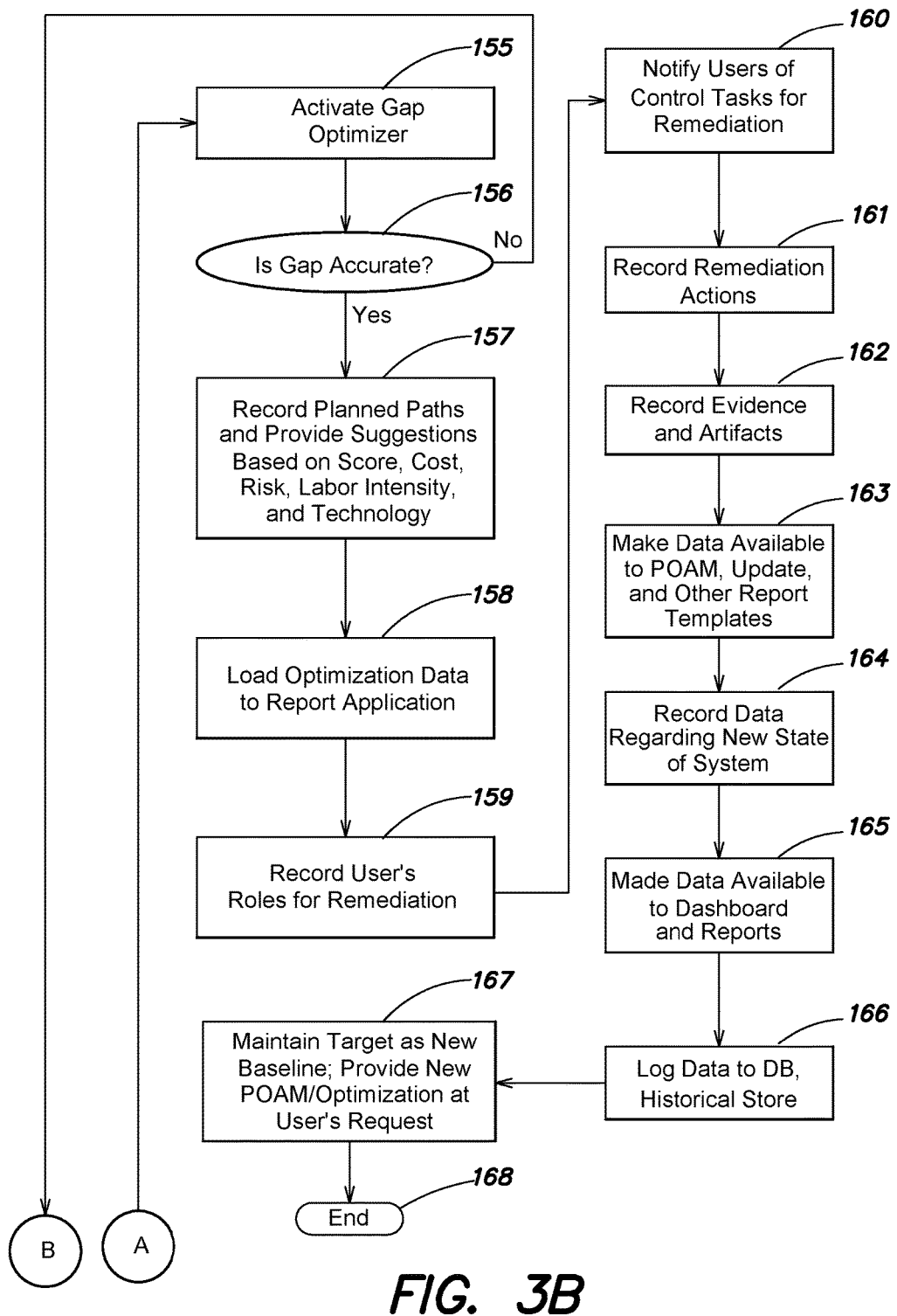

FIGS. 3A and 3B are a flow chart from the viewpoint of the cybersecurity scoring and recommendation system when performing an assessment of a system under evaluation according to one or more embodiments described herein. The procedure starts at step 143 and continues to step 144 where the cybersecurity scoring and recommendation system 99 authenticates an authorized user associated with the system under evaluation 98. For example, the authorized user may provide, utilizing device 101 and/or workstation 102, a username and password to the cybersecurity scoring and recommendation system 99 for authentication purposes.

After authentication, the procedure continues to step 145 where the cybersecurity scoring and recommendation system 99 activates one or more control interfaces and records the controls selected by the authorized user for evaluating the system 98, and also records other system related information provided by the authorized user. For example, the cybersecurity scoring and recommendation system 99 may record which controls have been assigned to particular users that are to score the controls.

In addition, the cybersecurity scoring and recommendation system 99 may assign numerical values (e.g., 0, 0.5, 1, N/A) to the user-provided assessment of the controls being evaluated, and then record this data. The cybersecurity scoring and recommendation system 99 may provide current state information to one or more authorized users. For example, the numerical value(s) representing the current state of the system under evaluation 98 may be displayed on the device 101 and/or workstation 102.

The cybersecurity scoring and recommendation system 99 may also provide the score as it is updated at one or more different times, wherein the current score (e.g., current state) is a number between 0-100. In addition, the cybersecurity scoring and recommendation system 99 may record cybersecurity "maturity" process information and convert that information into the numerical scale, as described above. Specifically, the maturity process information may indicate the maturation of a particular control over time and such information may be utilized by the cybersecurity scoring and recommendation system 99 to generate reports, provide suggestions, and/or provide query scripts.

The procedure continues to step 146 where the cybersecurity scoring and recommendation system 99 loads models/parameters from a database or other data store and records a baseline score for the system under evaluation. For example, the models/parameters may be utilized by the cybersecurity scoring and recommendation system 99 to classify the current state of the system under evaluation 98. Specifically, the models may be associated with other systems similar to the system under evaluation 98 and the models/parameters may include, but are not limited to, threat by sector/system models and information, compliance by sector models and information, etc. In addition, the cybersecurity scoring and recommendation system 99 may also record the individual baseline scores for the selected control and/or an overall baseline score for the system under evaluation.

In addition, the cybersecurity scoring and recommendation system 99 may record received user behavior and compliance data to generate the appropriate query scripts and to select particular machine learning models and artificial intelligence optimization. The user data and compliance data may be utilized to categorize and understand how a particular control develops over time, such that the cybersecurity scoring and recommendation system 99 can learn which controls are more problematic than others. This information can then be utilized to select better suggestion to be provided to the system under evaluation 98 and also to provide better query scripts.

The procedure continues to step 147 where the cybersecurity scoring and recommendation system 99 provides query scripts to the authorized user, wherein the query scripts elicit information from the authorized user concerning the completeness and applicability of the control set selected for evaluation of the system 98, and the cybersecurity scoring and recommendation system 99 records the answers provided by the authorized user. For example, the query scripts may be displayed on device 101 and/or workstation 102, and the authorized user may provide answers to the query scripting utilizing, for example, an input device of the device 101 and/or workstation 102. The procedure continues to step 148 where the cybersecurity scoring and recommendation system 99 asks the authorized user if the scoring of the system under evaluation 98 is accurate. For example, the cybersecurity scoring and recommendation system may display the baseline score(s) on the device 101 and/or workstation 102 and request that the authorized user confirm that the score is accurate. If the authorized user does not confirm that the scoring is accurate, the system may revert back to step 145.

However, if the authorized user confirms that the scoring accurate, the procedure continues to step 149 where the cybersecurity scoring and recommendation system 99 loads scoring models and provides one or more authorized users with one or more assessment reports via an application dashboard that may be displayed on the device 101 and/or workstation 102. Specifically, the scoring models are loaded to begin the process of generating reports that indicate the current state of the system under evaluation 98, wherein the scoring models include information about other similar systems having similar controls.

In an embodiment, the procedure continues to step 150 where the cybersecurity scoring and recommendation system 99 may provide application data and reports in response to a voice-command enabled chatbot that illustratively utilizes automatic speech recognition (ASR) and natural language understanding (NLU) to correct and interpret text. Further and in an embodiment, the cybersecurity scoring and recommendation system 99 may provide data and updates to authorized users using the voice-command enabled chatbot.

The procedure continues to step 151 where the cybersecurity scoring and recommendation system 99, through the reports API for example, provides customized reports and the baseline score(s). For example, the customized reports may be provided to stakeholders such as, but not limited to, information security teams, risk officers, executives, and board members according to one or more embodiments described herein. For example, the customized reports may indicate the current state of the system under evaluation 98. In addition, the baseline score may be displayed on device 101 and/or workstation 102 associated with the authorized user and/or stakeholder. The procedure continues to step 152 where the cybersecurity scoring and recommendation system 99 records assessment reporting data to generate one or more reports. For example, an authorized user may utilize the cybersecurity scoring and recommendation system 99 to produce a report on recent threats that have been addressed and mitigated and other reports regarding the current state of the system under evaluation 98.

The procedure continues to step 153 where the cybersecurity scoring and recommendation system 99 records the target state for the system under evaluation 98. For example, the authorized user may establish the target state utilizing device 101 and/or workstation 102 and the score associated with the target state may be displayed on device 101 and/or workstation 102. The procedure continues to step 154 where the cybersecurity scoring and recommendation system 99 records user-provided metadata to enhance metrics, recommendations, and/or optimizations. For example, the user-provided metadata may be utilized by the cybersecurity scoring and recommendation system 99 to provide better recommendations for subsequent evaluations of the system 98.

The procedure continues to step 155 where the cybersecurity scoring and recommendation system 99 determines the Gap for the system under evaluation 98, wherein the Gap represents the difference between the current state and target state for the system under evaluation 98. For example, the Gap may be determined and then displayed on device 101 and/or workstation 102. The procedure continues to step 156 where it is determined if the Gap is accurate. Specifically, the authorized user evaluates the Gap, representing the target state of the system under evaluation 98 versus the current state of the system under evaluation 98, to determine whether the Gap can be remediated and closed such that the system under evaluation 98 can move from the current state towards the target state. For example, the authorized user may indicate that the Gap is accurate or not accurate utilizing device 101 and/or workstation 102. If at step 156 it is determined that the Gap is not accurate, the system reverts back to step 153 where a new target for the system under evaluation 98 is recorded by the cybersecurity scoring and recommendation system 99 after the authorized user has provided a new target state.

If at step 156 it is determined that the Gap is accurate, the procedure continues to step 157 where the cybersecurity scoring and recommendation system 99 records the planned path(s) to remediate and close the Gap, and provides one or more suggestions to the authorized user to remediate and close the Gap between the current state and the target state of the system under evaluation 98 after, for example, user-generated parameters on cost, risk, process, technology, and labor are recorded. For example, a particular suggestion may be provided by the cybersecurity scoring and recommendation system 99 based on the current state of the system under evaluation 98 and/or answers provided to the query scripts. Specifically, the cybersecurity scoring and recommendation system 99 may store data that indicates that if a system under evaluation has a particular posture for a control (e.g., 0, 0.5, or 1) and provides a particular answer to one or more query scripts, then the cybersecurity scoring and recommendation system 99 should provide one or more particular suggestions to move the system under evaluation 98 form the current state towards the target state.

It is noted that the cybersecurity scoring and recommendation system 99 may generate and provide additional suggestions and query scripts to further mitigate the Gap, for example, after the system under evaluation 98 has been updated to further improve the confidentiality, availability, and integrity of the information system under evaluation 98.

The procedure continues to step 158 where the cybersecurity scoring and recommendation system 199 loads optimization data. The optimization data may be utilized to assist in mitigating the Gap. The procedure continues to step 159 where the cybersecurity scoring and recommendation system 99 records assigned tasks to be performed by one or more authorized users to begin the process of implementing recommendations to close the Gap. The procedure continues to step 160 and the cybersecurity scoring and recommendation system 99 notifies the users of controls task to be performed for remediation (e.g., to close the Gap). Specifically, the cybersecurity scoring and recommendation system 99 may send one or more messages to the device 101 and/or workstation 102 operated by authorized user to inform the authorized user of the task to be performed.

The procedure continues to step 161 where the cybersecurity scoring and recommendation system 99 records user remediation actions. For example, the authorized user may utilize device 101 and/or workstation 102 to indicate which actions have been taken to close the Gap for the system under evaluation 98. Specifically, the authorized user may utilize one or more user interfaces to provide the indications to the the cybersecurity scoring and recommendation system 99. In addition, the cybersecurity scoring and recommendation system 99 may record a new baseline score for the system under evaluation 98 after the suggestions have been implemented, and may update the score, and/or may generate new suggestions and/or query scripts to continuously and further improve the confidentiality, integrity, and availability of the system under evaluation 98.

The procedure continues to step 162 where and the cybersecurity scoring and recommendation system 99 records artifacts and evidence. Specifically, the artifacts and evidence may be provided by the authorized user to the cybersecurity scoring and recommendation system 99, wherein the artifacts and evidence indicate what suggestions and/or updates have been implemented by the system under evaluation 98 to improve the cybersecurity of the system under evaluation 98. For example, the authorized user may utilize device 101 and/or workstation 102 to provide the artifacts and evidence to the cybersecurity scoring and recommendation system 99.

The procedure continues to step 163 where the data regarding the changes to the system under evaluation 98 and the POAM utilized to update the system under evaluation 98 are provided to the authorized user. The procedure continues to step 164 where the cybersecurity scoring and recommendation system 99 may record data regarding the new state of the system under evaluation 98. For example, the cybersecurity scoring and recommendation system 99 may record information indicating the new current posture of the system under evaluation 98. The procedure continues to step 165 where the data regarding the new state of the system under evaluation 98 is made available to the dashboard. For example, the dashboard may be displayed on device 101 and/or workstation 102 such that the authorized user may view information regarding the new state of the system under evaluation 98. The procedure continues to step 166 where the data regarding the new state of the system under evaluation 98 may be recorded or logged to a database and/or historical store.

The procedure continues to step 167 where the new state of the system under evaluation 98 is determined, by the cybersecurity scoring and recommendation system 99, to be the new baseline for the system under evaluation 98 and new POAM/optimization to further mitigate the Gap or to create a new target state for implementation may be provided based on the authorized user's request. For example, the authorized user may determine that the confidentiality, availability, and/or integrity of the system under evaluation 98 may be improved further. The procedure then ends at step 168.

Figure 4A:
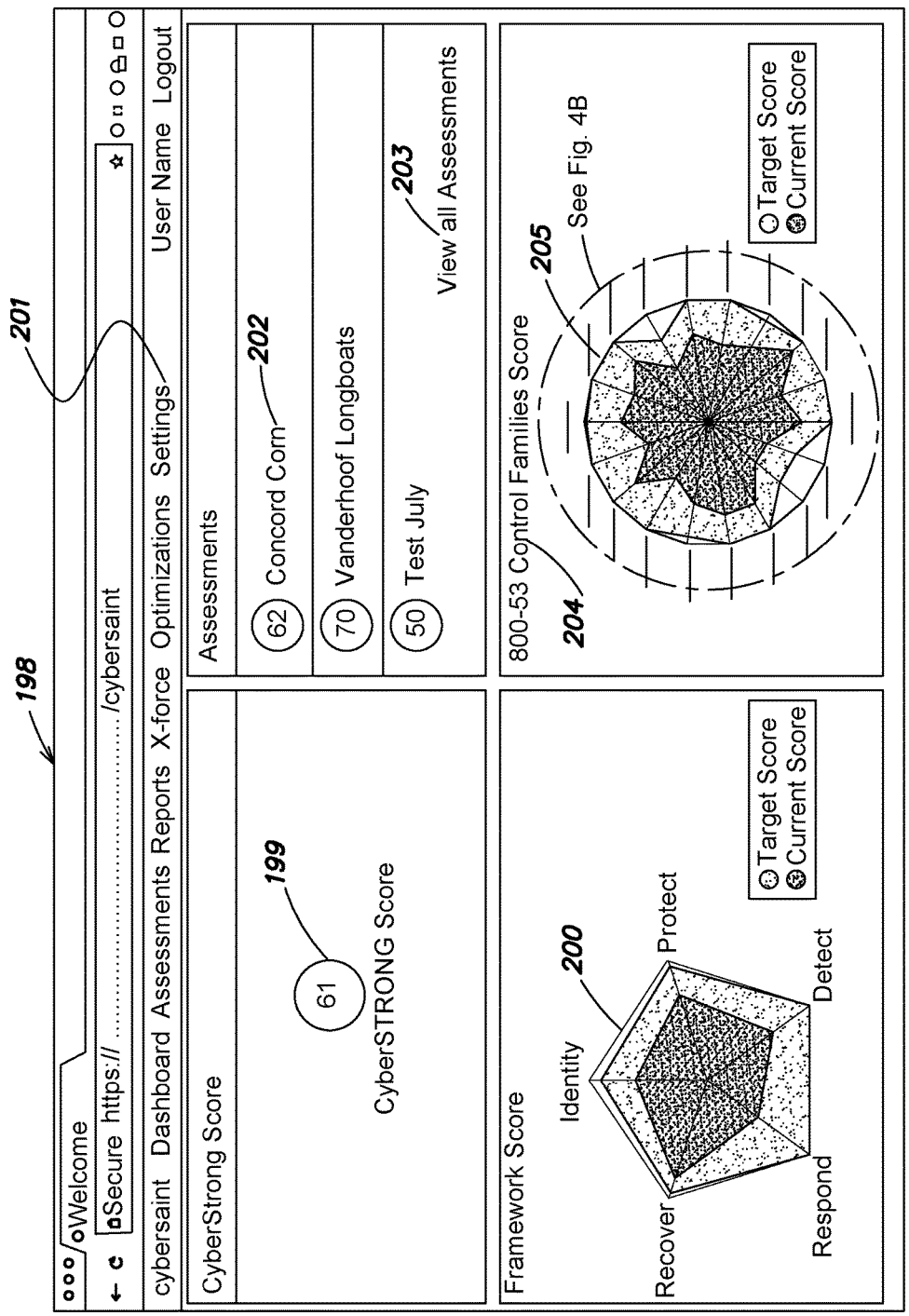
FIG. 4A is an exemplary user interface representing a dashboard view according to one or more embodiments described herein.

FIG. 4A is an exemplary user interface representing a dashboard view 198 according to one or more embodiments described herein. Dashboard view 198 may be accessed by the authorized user utilizing device 101 and/or workstation 102. Specifically, the authorized user may log onto a website associated with cybersecurity scoring and recommendation system 99 and provide a unique username and a password to gain access the dashboard view 198 associated with the system under evaluation 98. The dashboard view 198 may provide to the authorized user assessments and scoring of the system under evaluation 98. For example and with reference to FIG. 4A, the current score 199 is displayed in a portion of the dashboard view 198, wherein the current score 199 indicates the current posture of the system under evaluation 98 (e.g., baseline score). In this example, the current score of 61 (from 0-100) indicates the current state of the system under evaluation 98. The dashboard view 198 may further include a spider chart 200 that depicts that current and target states for the overall assessment of the system under evaluation 98.

For example, the spider chart may depict the current state and target state, as depicted in the gray scale, for the assessment of the system under evaluation 98 with respect to the five functions of NIST's CSF (e.g., identify, protect, detect, respond, and recover). As known by those skilled in the art NIST CSF has five critical functions: Identify, Protect, Detect, Respond, and Recover. These are high-level actions for organizations to implement and continuously improve upon. Each Framework function has a set of associated categories and subcategories, which represent a more specific set of cybersecurity activities. For example, the function Identify's first category is Asset Management, which directs the organization to consider all the assets they have under management that support their business functions. The first subcategory within Asset Management is ID.AM-1: Physical devices and systems within the organization are inventoried. Within each subcategory, then, there exists a set of associated controls from NIST 800-53 Revision 4, the contents of which are hereby incorporated by reference.

The dashboard view 198 may further include a navigational bar 201 that enumerates the system utilities and optimizations provided by the cybersecurity scoring and recommendation system 99 to an authorized user. As depicted in FIG. 4A, the authorized user may select one of a variety of different tabs (e.g., dashboard, assessments, reports, X-force, optimizations, and settings) from navigation bar 201 to perform one or more different functions. For example, the authorized user may view the dashboard by selecting the dashboard tab. Further, the authorized user may select the assessments tab to select a system under evaluation. As depicted in FIG. 4A, there are three total systems under evaluation, namely Concord Corn, Vanderhoof Longboats, and TestJuly. In addition, the authorized user may select the reports tab to generate one or more reports as described above. Furthermore, the authorized user may select the X-force tab to access the top twenty threats updated daily through IBM's threat feed, which draws on communal curation, and other threat databases such as the National Vulnerability Database, US-CERT, and BugTraq. Moreover, the authorized user may select the optimizations tab to view the results of a cost versus impact algorithm that projects to a target score.

Even further, the authorized user may select the settings tab to change one or more settings associated with the system under evaluation 98 or change one or more settings associated with the authorized user. For example, the authorized user may change his/her password after selecting the settings tab or, for example, enable two-factor authentication by scanning a QR code. Although reference is made to particular tabs in navigation bar 201, it is expressly contemplated that the navigation bar 201 may have additional and/or different tabs.

The dashboard view 198 further includes active assessments 202 that include the the assessments (e.g., scores), associated with the system under evaluation 98, which are open and under evaluation. For example, the assessments depicted in FIG. 4A indicate a baseline score for the system under evaluation 98, while the "Cyberstrong" score is a "rollup" score (e.g., overall score) of all three assessments, which represents an average of the assessment scores of Concord Corn, Vanderhoof Longboats, and TestJuly. This navigational button 203 may be selected by the authorized user such that the authorized user can view all assessments that are opened and under evaluation. A descriptor 204 indicates a schema for the data provided by the spider chart 205. In this example, the descriptor 204 indicates that the spider-chart 205 is associated the plurality of different control families and the current and target scores for each of the different control families.

Figure 4B:
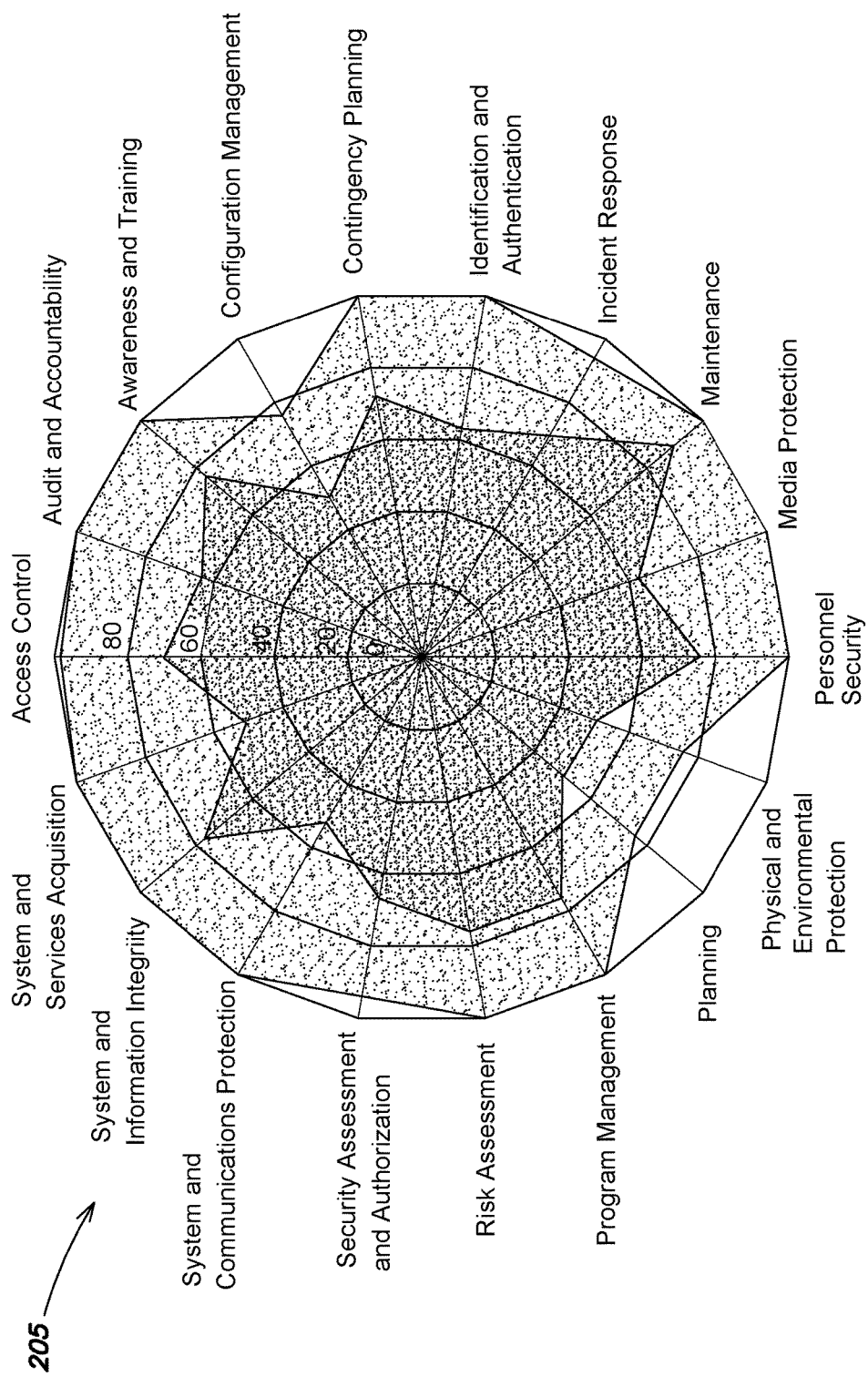
FIG. 4B is an exemplary and detailed spider chart as referenced in FIG. 4A.

Specifically, the spider chart 205 provides a depiction of the current score and and target score, as depicted in the gray scale, of the system under evaluation for each of the 18 control families in NIST's Cybersecurity Framework. More specifically, and with reference to the exemplary and detailed spider chart 205 as depicted in FIG. 4B, the 18 control families include: Access Control, Audit and Accountability, Awareness and Training, Security Assessment and Authorization, Configuration Management, Contingency Planning, Identification and Authentication, Incident Response, Maintenance, Media Protection, Physical and Environmental Protection, Planning, Personnel Security, Risk Assessment, System and Services Acquisition, System and Communications Protection, System and Information Integrity, and Program Management. Although spider chart 205 provides scores for each of the 18 control families in the NIST's CSF, it is expressly contemplated that spider chart 205 may depict the scores for any other cybersecurity framework.

Figure 5A:
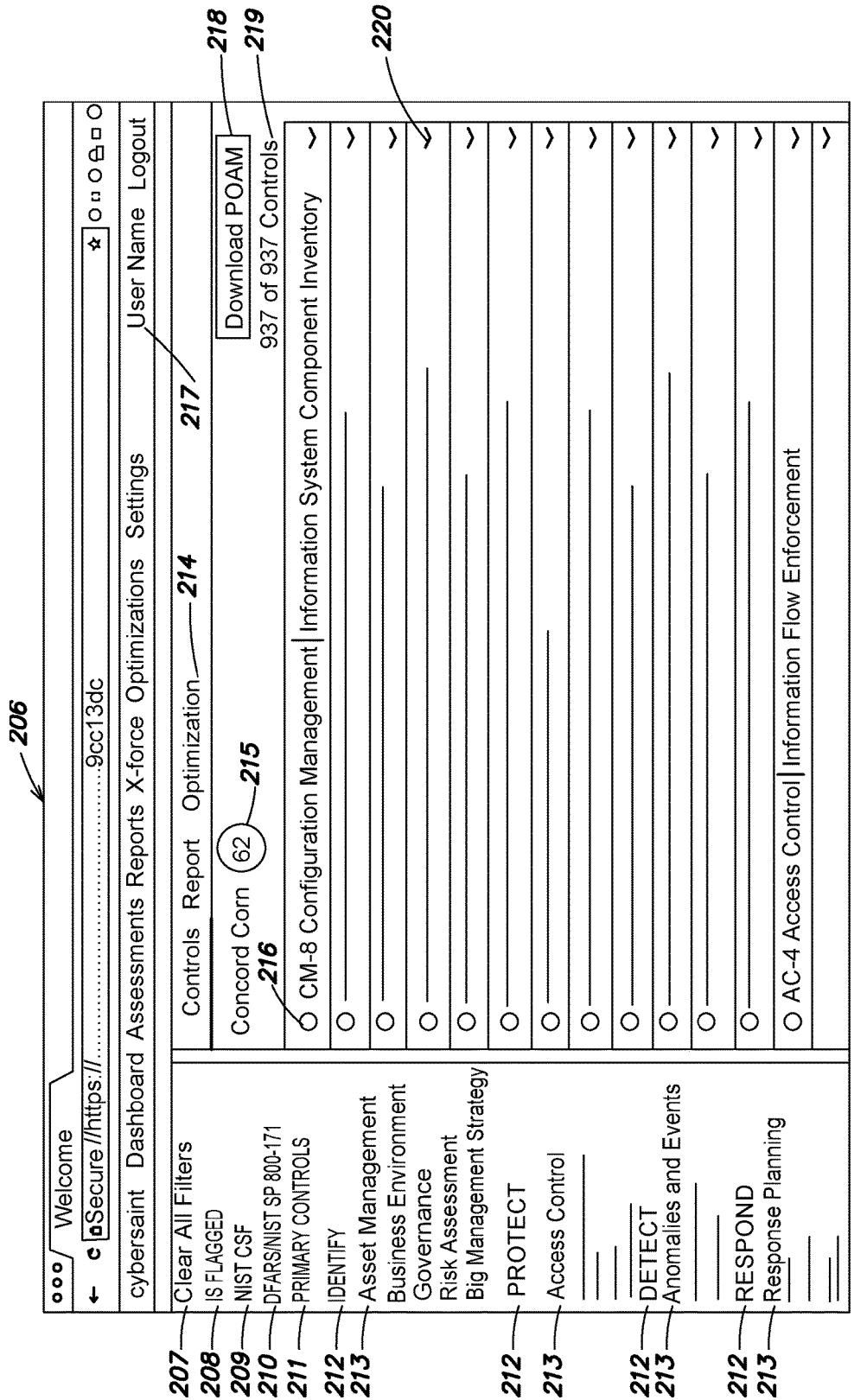
FIG. 5A is an exemplary user interface illustrating controls and utilities utilized to score a system under evaluation according to one or more embodiments described herein.

FIG. 5A is an exemplary user interface 206 illustrating controls and utilities utilized to score a system under evaluation 98 according to one or more embodiments described herein. Button 207 may be selected to cancel all control and framework filtering. That is, button 207 may be selected by the authorized user to "restart" the evaluation of the system 98. Button 208 may be selected by the authorized user to view all of the controls that have been flagged for the system under evaluation 98. For example, the authorized user may flag particular controls and the controls may be recorded by the cybersecurity scoring and recommendation system 99. In addition, user interface 206 may include button 209, which if selected, causes the interface to display only those controls that apply to NIST CSF: Identify, Protect, Detect, Respond, and Recover, which are hereby incorporated by reference. In this example, the user has selected button 209 and as such, the functions, defined by buttons 212 and associated with NIST CSF, are displayed.

In addition, user interface 206 may include button 210, which if selected, causes the interface to display only those controls that apply to the Defense Federal Acquisition Regulation Supplement (DFARS), a regulatory standard for defense contractors, which is hereby incorporated by reference. For example, if the authorized user selects button 210, the user interface 206 would display those functions associated with DFARS instead of the functions associated with NIST CSF as depicted in FIG. 5A. To select only primary controls, which are designed to be critical and early-implementation controls, an authorized user may select button/filter 211. For example, a critical and early-implementation control may be AC-2: Account Management, which contains basic account management practices.

Buttons 212 allows the authorized user to sort the NIST CSF controls by Framework functions, which include Identify, Protect, Detect, Respond, and Recover. The functions are a series of generalized actions for organizations to implement and continuously improve upon, as specified by the NIST CSF. Specifically, and by selecting button 212, the cybersecurity scoring and recommendation system may display buttons 213, which are selectable, and that represent the categories (e.g., asset management, business environment, governance, risk assessment, and risk management strategy) for each of the functions. For example, the function Identify's first category is Asset Management, which directs the organization to consider all the assets they have under management that support their business functions.

By selecting a particular button 213, representing a category, the cybersecurity scoring and recommendation system may display the applicable controls for the category. For example, and after selecting a button 213, representing the category "Asset Management", the cybersecurity and scoring recommendation system may display the controls in the main window as depicted in FIG. 5A. Alternatively, if button 213, associated with Anomalies and Events that is a category associated with Framework function Detect, was selected, the cybersecurity scoring and recommendation system 99 may display in the main window the controls associated with Anomalies and Events category. For illustrative and simplicity purposes, FIG. 5A does not list all of the categories associated with each of the different framework functions (e.g., Identify, Protect, Detect, Respond, and Recover).

Toolbar 214 allows an authorized user to access the controls list page, view a general report depicting baseline posture along the five functions of the Cybersecurity Framework, as well as access a landing page that shows a cost versus impact optimization that suggests three individual lists of controls to attain three discrete target scores of increasing value according to an embodiment of the cybersecurity scoring and recommendation system 99.

Text block and score 215 represent the name provided to a particular assessment by, for example, an authorized user, as well as the score provided by the cybersecurity scoring and recommendation system 99 for the system under evaluation 98 irrespective of function or category, etc. In the example as depicted in FIG. 5A, the name of the assessment is "Concord Corn," and the overall score is 62 representing the score for the system under evaluation 98, out of 100, for the NIST CSF. A scoring graphic 216 represents the current score for each of the controls listed in the interface 206. For illustrative and simplicity purposes, FIG. 5A lists only two specific controls associated with the category "Asset Management" in the main window. Text block 217 represents the user name (e.g., handle) of the authorized user conducting an assessment of the system under evaluation 98. Button 218 produces a detailed POAM based upon the current baseline score that is based on the individual scoring graphics 216, of the system under evaluation 98. For example, the authorized user may select button 218 to download a copy of the POAM. Text block 219 represents a running count of the controls selected by the authorized user. Dropdown utility 220, if selected by a user, displays the current status for a control, wherein the current status is, for example, Not Compliant, Partially Compliant, or Fully Compliant, which are the descriptors for compliance states associated with the numerical scores: (e.g., 0, 0.5, and 1).

Figure 5B:
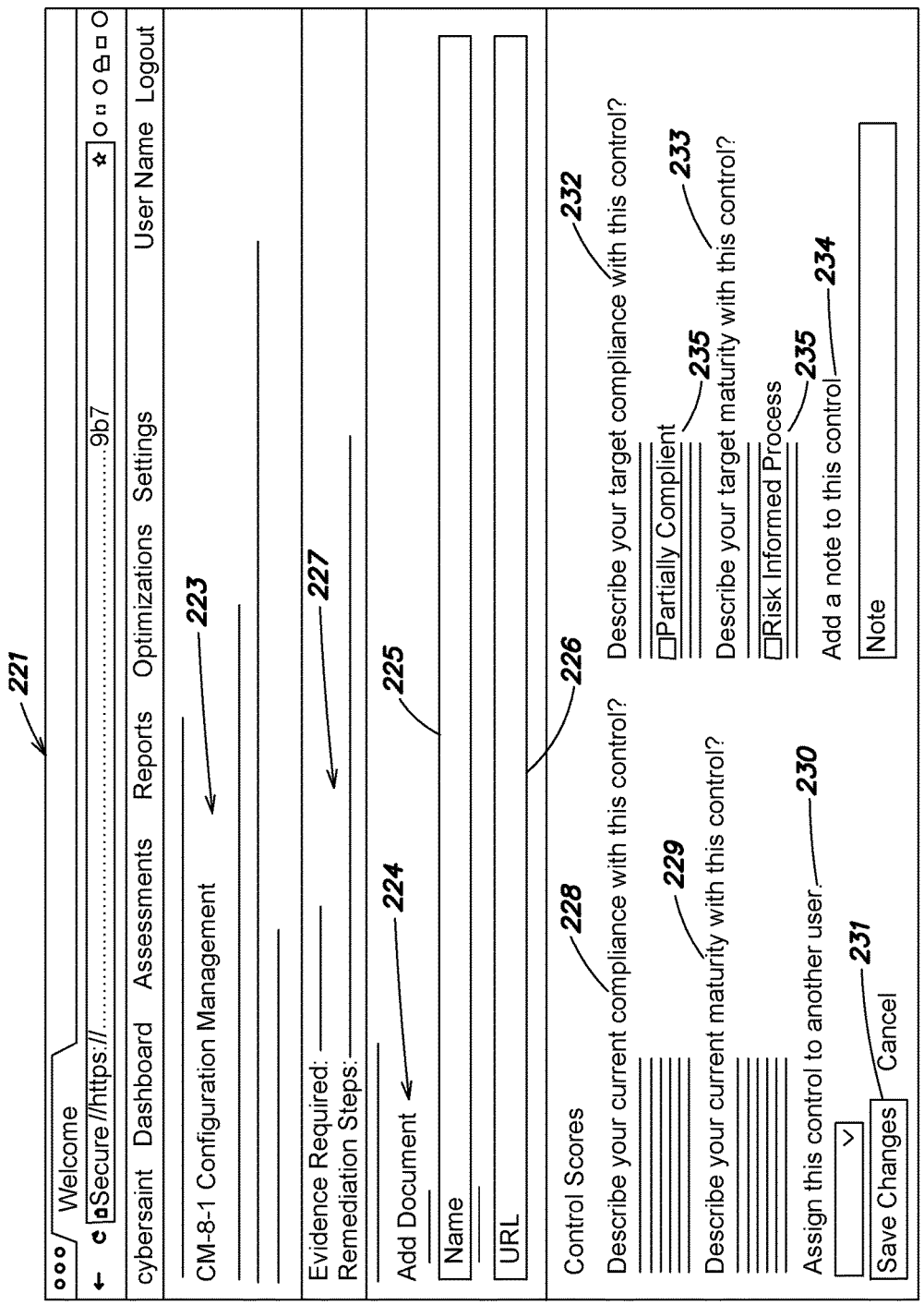
FIG. 5B is an exemplary control scoring interface according to one or more embodiments described herein.

FIG. 5B is an exemplary control scoring interface 221 according to one or more embodiments described herein. The control scoring interface 221 includes toolbar 222 that an authorized user may utilize to navigate the utilities of the cybersecurity scoring and recommendation system 99. Specifically, the authorized user may gain access to the "Dashboard," "Assessments," "Reports," "Optimizations," and "Settings," by selecting appropriate link from toolbar 222 as described above with respect to FIG. 5A. Text block 223 represents the name and location, within the Cybersecurity Framework, of a particular control being evaluated. Button 224 represents a portion of controls scoring interface 221 that allows the authorized user to upload evidentiary artifacts and/or documents to the cybersecurity scoring and recommendation system 99 and/or other location. Text field 225 may receive user input from the authorized user to provide a name for the evidentiary artifact and/or document that is to be uploaded, such that when the cybersecurity scoring and recommendation system 99 stores the evidentiary artifact/document it can be associated with the name provided by the authorized user.

Text field 226 may receive a URL, provided by the user, associated with the evidentiary artifact and/or document. For example, the URL may be the location of the evidentiary artifact/document, such that it can be retrieved from the location to be stored by the cybersecurity scoring and recommendation system 99. Text field 227 includes one or more simplified tasks or instructions provided by the cybersecurity scoring and recommendation system 99 to an authorized user in order to facilitate compliance and to move the current score towards the target score. Query script 228, 229, 232, and 233 are illustrative and are provided by the cybersecurity scoring and recommendation system 99 to the authorized user. Scoring fields 235 may be selected by the authorized user to provide answers to the query scripts provided by the cybersecurity scoring and recommendation system 99.

Dropdown menu 230 may be manipulated by the authorized user to assign a particular control to other authorized users, as described above. Notes field 234 provides a field such that the authorized user may input notes or comments that are relevant to the control under assessment. Button 231 may be selected by the authorized user to save the data associated with control scoring interface 221 within the cybersecurity scoring and recommendation system 99.

Figure 6A:
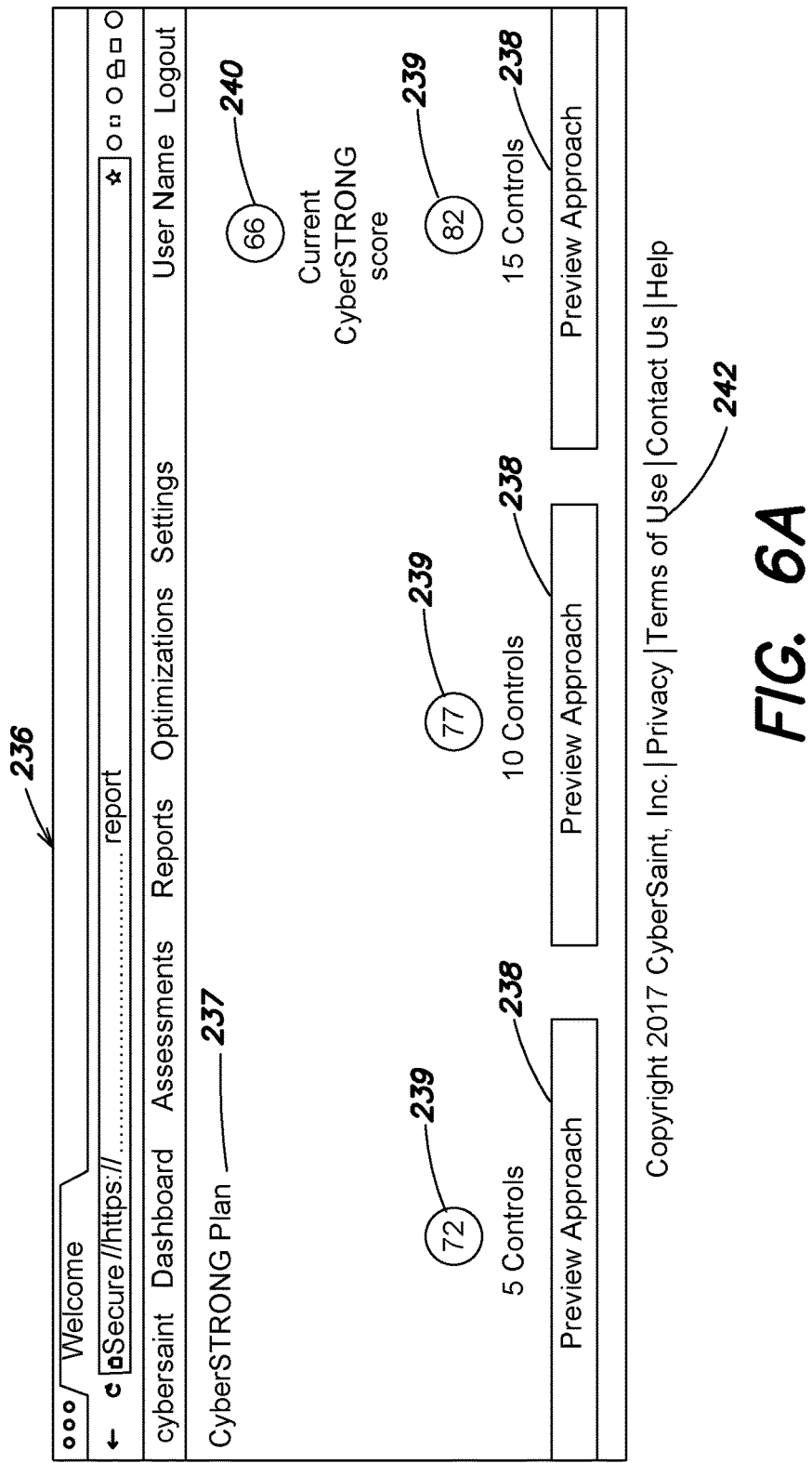
FIG. 6A is an exemplary graphical interface utilized to provides optimizations to an authorized user according to one or more embodiments described herein.

FIG. 6A is an exemplary graphical interface 236 utilized to provide optimizations to an authorized user according to one or more embodiments described herein. Text block 237 represents the name of one particular optimization plan provided by the cybersecurity scoring and recommendation system 99. As depicted in FIG. 6A, graphical interface 236 includes the current score 240 of the system under evaluation 98. In this example, the current score 240 is 66. Specifically, the current score may be determined by the cybersecurity scoring and recommendation system 99 and represents the current "posture" of the system under evaluation 98. Graphical interface 236 includes three sections where each section includes a target score 241 associated with a number of controls. For example, the target score 239 in the first section is 72 and is associated with five particular controls, indicating that the five particular controls can be manipulated to move the system under evaluation 98 from the current score of 66 to the target score of 72. Similarly, the target score 239 in the second section is 77 and is associated with ten particular controls, indicating that the ten particular controls can be manipulated to move the system under evaluation 98 from the current score of 66 to the target score of 77. In addition, the target score 239 in the third section is 82 and is associated with fifteen particular controls, indicating that the fifteen particular controls can be manipulated to move the system under evaluation 98 from the current score of 66 to the target score of 82.

Further, each section includes button 238 that may be selected by the authorized user to preview the approach to move the system under evaluation 98 from the current score to the target score. For example, and by selecting button 238, the cybersecurity scoring and recommendation system 99 may list the particular controls that are to be manipulated to move the system under evaluation 98 from the current score 240 to the target score 239. In addition, the graphical interface 236 may further include copyright, privacy, contact information, and terms of use links 242 for the authorized user.

Figure 6B:
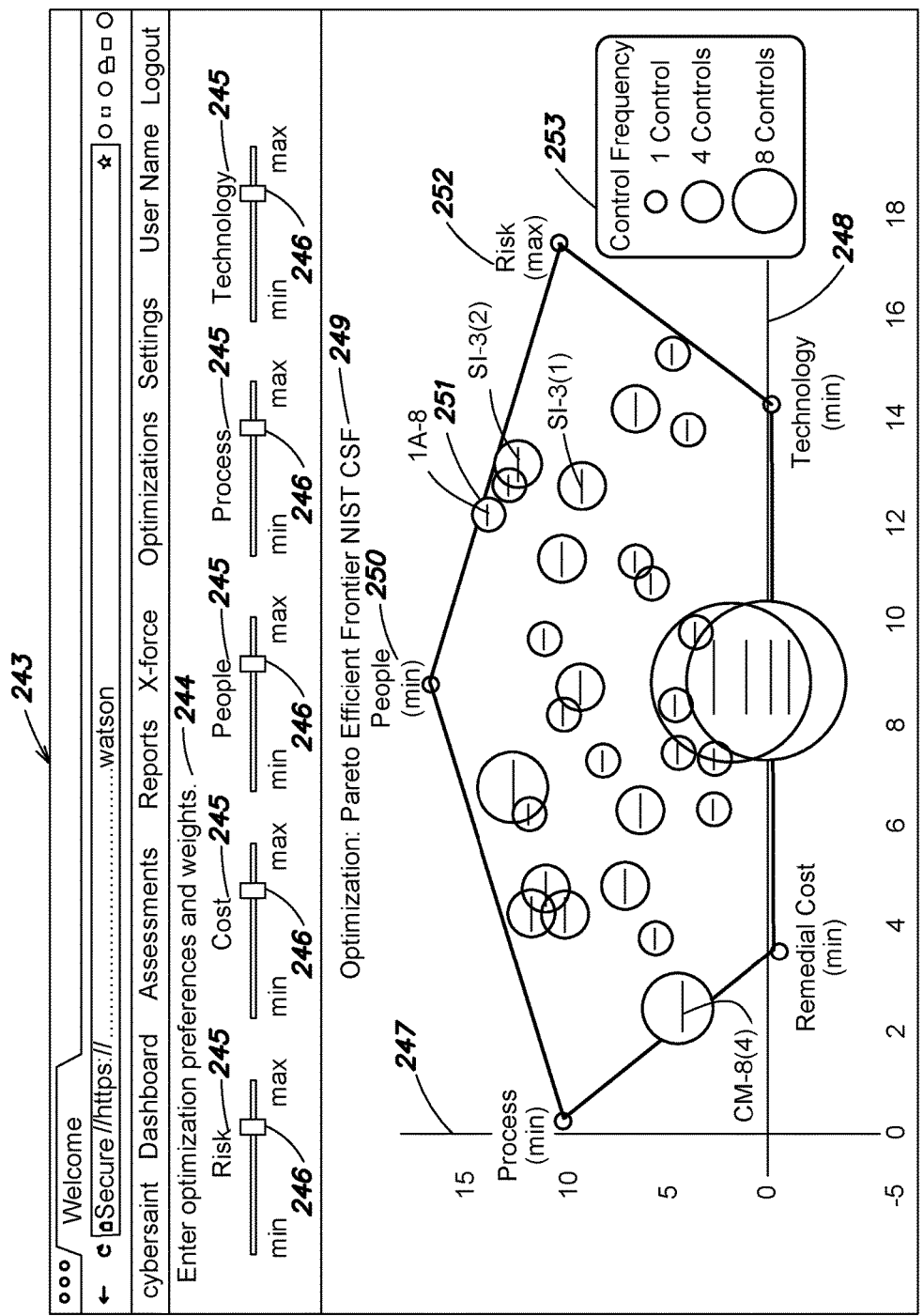
FIG. 6B is an exemplary graphical interface associated with Pareto Optimization according to one or more embodiments described herein.

FIG. 6B is an exemplary graphical interface 243 associated with Pareto Optimization according to one or more embodiments described herein. Graphical interface 243 may provide a Pareto Efficient frontier optimization based upon cost, risk, and other variables to an authorized user. Text block 244 is a header that indicates that the authorized user should enter values associated with the organizational utility for the system under evaluation 98 so that the Gap between the current score and target score may be optimized according to one or more embodiments described herein. For example, the user may provide values for categories 245 that include, but are not limited to, "Risk," "Cost," "People," Process," and "Technology."

The category "Risk" represents a risk score based on the Risk Management Framework methodology specified in the National Institute of Standards and Technology's Special Publication 800-30, which is widely accepted as industry best practice in the quantification of risk and which is hereby incorporated by reference. Essentially, organizations evaluate the likelihood and impact of cyber events (threats, breaches, exfiltration, reputational damage, and vulnerabilities) and compute: L×I per control (where L is likelihood, and I is Impact). This may produce a risk score for each control on a 0-25 scale, for example. The category "Cost" may be a number representing the approximate relative cost to an organization to implement a particular control. For example, a control that specifies having a firewall in place will be more expensive to the organization than a control that requires a policy document. The category "People" may be a number that represents the relative labor intensity of implementing a particular control to the individuals at the organization. The category "Process" may be a number that represents the relative procedural intensity of implementing a particular control. In addition, the category "Technology" may be a number that represents the relative technological intensity of implementing a particular control. The authorized user may utilizing sliders 246 to provide a particular numerical value to each of the categories 245, and the cybersecurity scoring and recommendation system 99 may record the provides values that are utilized for the Pareto Optimization as described herein.

The title 249 of this particular Optimization Graph is "Pareto Efficient Frontier NIST CSF" and represents an optimization for the NIST CSF controls. The y-axis 247 of the Pareto Optimization graph lists integer values from −5 to 15, and the X-axis list values from −5 to 18. The five vertices on the graphic represent the categories 245 and are (from top left and clockwise) Process, People, Risk, Technology, and Cost. Based on the values provided by the authorized user utilizing sliders 246, the particular graphic is output on the X-axis and Y-axis. "Min" and "Max," beneath each node or vertex, indicates to the algorithm, implemented by the cybersecurity scoring and recommendation system 99, to either minimize or maximize that value subject to the other constraints put upon the 4 other variables. Although reference is made to the graphic including five variables, it is expressly contemplated that any number of variables may be utilized. In addition or alternatively, several different methods of relative scoring, based on metadata, etc., may be utilized to enrich and retrain models.

The x-axis 248 of the Pareto Optimization Graph represents a coordinate for a particular control. The y-axis 247 is also a coordinate measure. Essential to a Pareto optimization is the concept of non-dominated solutions as known by those skilled in the art, where a Pareto optimization rank-orders by the top results, each of which is better than a whole set of lesser results. In this particular solution as depicted in FIG. 6B, there are three-hundred-and-two controls in the optimization, and the depicted controls on the graphic "dominated" the two-hundred-and-seventy controls that are not depicted. For example, the position of SI-3(2), representing a control and near the "Risk" vertex, indicates that it has a higher "Risk" score than controls to its left on the coordinate axes. Each "bubble" in FIG. 6B represents a multi-dimensional position of the Pareto Optimization and includes one or more controls. In addition, and as depicted in FIG. 6B, the size of each "bubble" reflects how many times the control occurs within the NIST CSF (many controls occur more than once).

Text block 250 represents another dimension (the labor weighting of a particular control, or "People") of the depicted multi-objective optimization provided by the cybersecurity scoring and recommendation system 99. This bubble-graphic 251 represents the frequency and relative utility of a particular "Gap" control (IA-8) provided by the cybersecurity scoring and recommendation system 99 to an authorized user. This text block 252 represents another dimension (the risk weighting of a particular control) of the depicted multi-objective optimization according to an embodiment described here. Legend 253 depicts the frequency or redundancy of a particular control within the NIST CSF. For example, the authorized user may utilize this graphic as depicted in FIG. 6B to conclude that improving their scores on controls SI-3(1) and SI-3(2) requires little additional labor while addressing a high level of risk within the system under evaluation. Additionally, the authorized user may determine to improve their control score on CM-8(4) because the associated cost and required technology of further implementation for such a control is low.

FIG. 7 is an exemplary graphical interface 255 associated with providing query scripts according to one or more embodiments described herein. Graphical interface 255 may be overlaid on the graphical interface as depicted in FIG. 5B and may provide query scripts based upon the baseline score, metadata, historical data, and/or target score to an authorized user to improve the confidentiality, integrity, and availability of the data of the system under evaluation 98. It is noted that the cybersecurity scoring and recommendation system 99 may record the improvement implemented by the system under evaluation 98 and update the score and provide new recommendations dynamically. Specifically, and with reference to FIG. 7, the cybersecurity scoring and recommendation system 99 may provide to an authorized user a graphical pop-up 256 that includes one or more query scripts 257 that are generated based upon the baseline score, metadata, historical data, and/or target score. The authorized user may then provide one or more responses to the query scripts 257 by selecting the "Yes" entry field 258 or the "No"

entry field 259. In addition, a command line interface 260 may be provided such that the authorized user may provide text responses to the query scripts 257.

Figure 8:
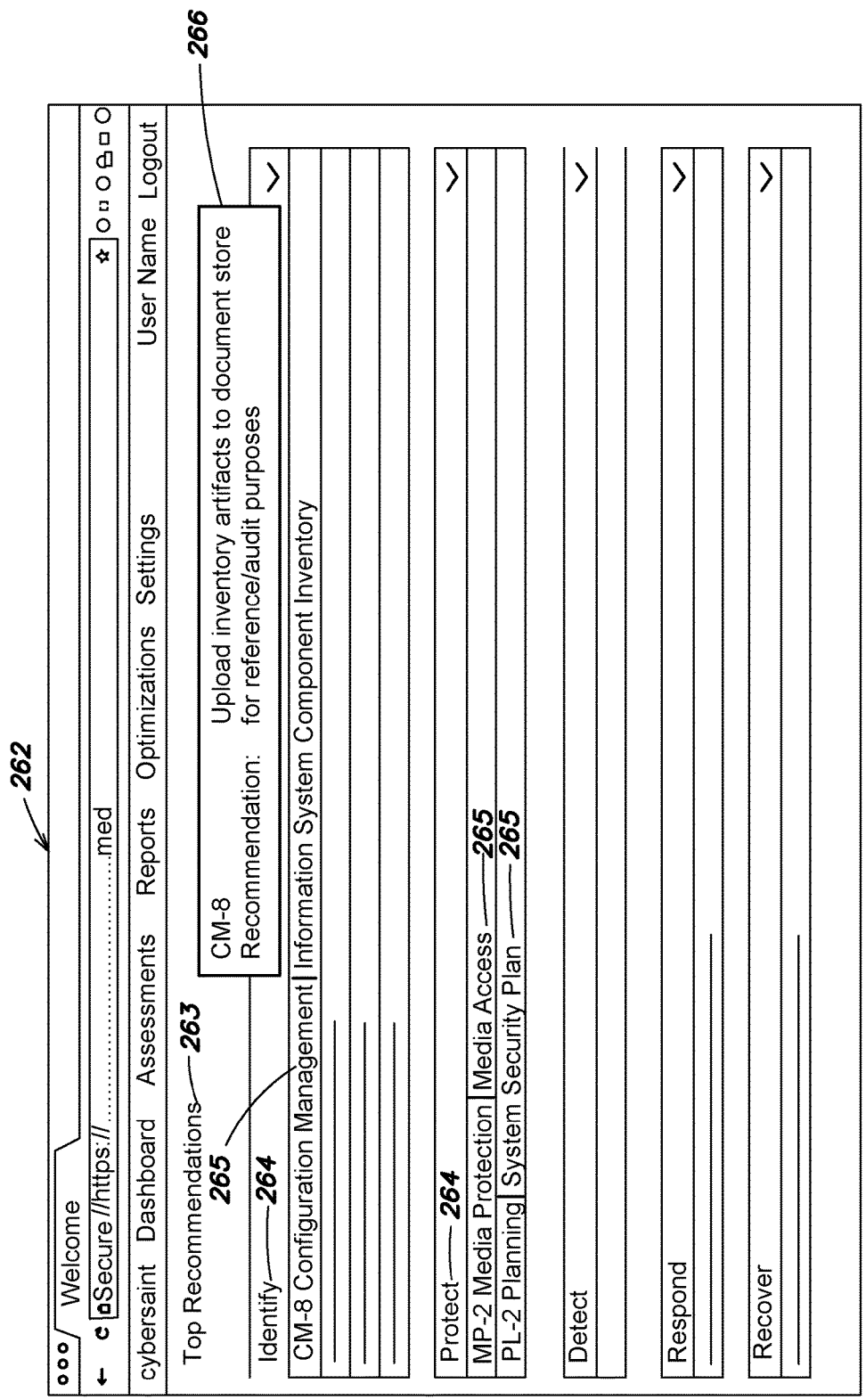
FIG. 8 is an exemplary graphical interface associated with providing a recommendation according to one or more embodiments described herein.

FIG. 8 is an exemplary graphical interface 262 associated with providing a recommendation according to one or more embodiments described herein. Graphical interface 262 may provide recommendations based upon the baseline score, metadata, historical data, and/or target to an authorized user to improve the confidentiality, integrity, and availability of the data within the system under evaluation 98. Text block 263 may indicate to the authorized user that cybersecurity scoring and recommendation system is providing top recommendations to move the system under evaluation 98 from the current state towards the target state. For example, particular recommendations may be determined, by the cybersecurity scoring and recommendation system 99, to be "top" recommendations based on other recommendations implemented by other similar systems. Text block 264 indicates the function 264 for the one or more specific recommendations 265 provided by the cybersecurity scoring and recommendation system 99.

For example, and as depicted in FIG. 8, there are four particular recommendations 265 provided by the cybersecurity scoring and recommendation system for the "identify" category of NIST CSF. In addition, there are two particular recommendations provided by the cybersecurity scoring and recommendation system for the "protect" category of the NIST CSF. Further, pop-up window 266 may be provided by the cybersecurity scoring and recommendation system that indicates more details for a recommendation. For example, and with reference to FIG. 8, the provide recommendation may be "CM-8 Configuration Management! Information System Component Inventory," and the pop-up window 266 may provide the details of "Upload inventory artifacts to document store for reference/audit purposes."

This description is to be taken only by way of example and not to otherwise limit the scope of the embodiments herein. It is the object of the appended claims to cover all such variations and modifications as come within the true spirit and scope of the embodiments herein. The drawings are not drawn to scale and are not intended to limit is the full scope of the embodiments herein.

What is claimed is:
1. A cybersecurity system, comprising:
processing logic configured to:
receive, over a network and from a client system, control information associated with one or more cybersecurity controls, wherein the control information indicates a current state of the client system with respect to each cybersecurity control of the one or more cybersecurity controls;
transmit, over the network and to the client system, one or more query scripts based on at least a target state of the client system and the control information;
receive, over the network and from the client system, one or more responses to the one or more query scripts; and
transmit, over the network and to the client system, one or more suggestions for moving cybersecurity of the client system from the current state towards the target state, wherein the one or more suggestions are based on at least the one or more responses and the current state of the client system, and wherein the one or more suggestions include one or more updates to be made to the client system to improve the cybersecurity of the client system.

2. The cybersecurity system of claim 1, wherein the one or more suggestions are created using logic, wherein the logic includes one or more of artificial intelligence, machine learning, fuzzy logic, and neural networks.

3. The cybersecurity system of claim 1, wherein the one or more cybersecurity controls are based on one of an industry standard framework and a custom framework.

4. The cybersecurity system of claim 1, wherein moving the current state of the client system towards the target state of the client system is based on an initial score derived from the control information and a target score derived from target control information.

5. The cybersecurity system of claim 1, wherein the processing logic is further configured to generate one or more progress reports utilizing the control information, wherein the control information is timestamped.

6. The cybersecurity system of claim 1, wherein the processing logic is further configured to display, on a display, the control information in one or more graphical formats, wherein the one or more graphical formats includes one or more of a spider chart, a radar chart, a bar chart, and a table.

7. The cybersecurity system of claim 1, further comprising one or more defined user roles that include one or more of a super user, an administrator, a consultant, and an end user.

8. The cybersecurity system of claim 1, wherein the processing logic is further configured to identify, utilizing an audit trail, changes to one or more of a user name, a date, a time, a media access control (MAC) address, an Internet Protocol (IP) address, a location, a device type, and a biometric recognition.

9. The cybersecurity system of claim 1, wherein the control information indicates one of whether the client system is in compliance with a particular cybersecurity control, is not in compliance with the particular cybersecurity control, is in partial compliance with the particular cybersecurity control, and that the particular cybersecurity control is not applicable to the client system.

10. A cybersecurity system configured to:
receive, over a network and from a client system, control information associated with one or more cybersecurity controls, wherein the control information indicates a current state of the client system with respect to each cybersecurity control of the one or more cybersecurity controls;
transmit, over the network and to the client system, one or more query scripts based on at least a target state of the client system and the control information;
receive, over the network and from the client system, one or more responses to the one or more query scripts;
transmit, over the network and to the client system, one or more suggestions for moving cybersecurity of the client system from the current state towards the target state, wherein the one or more suggestions are based on at least the one or more responses and the current state of the client system;
determine if the client computing system has been updated according to the one or is more suggestions;
in response to determining that a particular cybersecurity control has been updated based on the one or more suggestions, provide, to the client system, a new compliance value for the particular cybersecurity control; and
in response to determining that the particular cybersecurity control has not been updated based on the one or more suggestions, provide, to the client system, an alert indicating that the particular cybersecurity control has not been updated.

11. The cybersecurity system of claim 10, wherein the one or more suggestions are created using logic, wherein the logic includes one or more of artificial intelligence, machine learning, fuzzy logic, and neural networks.

12. The cybersecurity system of claim 10, wherein the one or more cybersecurity controls are based on one of an industry standard framework and a custom framework.

13. The cybersecurity system of claim 10, wherein moving the current state of the client system towards the target state of the client system is based on an initial score derived from the control information and a target score derived from target control information.

14. The cybersecurity system of claim 10, wherein the processing logic is further configured to generate one or more progress reports utilizing the control information, wherein the control information is timestamped.

15. The cybersecurity system of claim 10, wherein the processing logic is further configured to display, on a display, the control information in one or more graphical formats, wherein the one or more graphical formats includes one or more of a spider chart, a radar chart, a bar chart, and a table.

16. The cybersecurity system of claim 10, further comprising one or more defined user roles that include one or more of a super user, an administrator, a consultant, and an end user.

17. The cybersecurity system of claim 10, wherein the processing logic is further configured to identify, utilizing an audit trail, changes to one or more of a user name, a date, a time, a media access control (MAC) address, an Internet Protocol (IP) address, a location, a device type, and a biometric recognition.

18. The cybersecurity system of claim 10, wherein the control information indicates one of whether the client system is in compliance with a particular cybersecurity control, is not in compliance with the particular cybersecurity control, is in partial compliance with the particular cybersecurity control, and that the particular cybersecurity control is not applicable to the client system.

19. A non-transitory computer-readable storage media storing:
one or more instructions that, when executed, cause at least one processing device to:
receive, over a network and from a client system, control information s associated with one or more cybersecurity controls, wherein the control information indicates a current state of the client system with respect to each cybersecurity control of the one or more cybersecurity controls;
transmit, over the network and to the client system, one or more query scripts based on at least a target state of the client system and the control information;
receive, over the network and from the client system, one or more responses to the one or more query scripts; and
transmit, over the network and to the client system, one or more suggestions for moving cybersecurity of the client system from the current state towards the target state, wherein the one or more suggestions are based on at least the one or more responses and the current state of the client system, and wherein the one or more suggestions include one or more updates to be made to the client system to improve the cybersecurity of the client system.

20. The non-transitory computer-readable storage media of claim 19, wherein the one or more suggestions are created using logic, wherein the logic includes one or more of artificial intelligence, machine learning, fuzzy logic, and neural networks.

21. The non-transitory computer-readable storage media of claim 19, wherein the one or more cybersecurity controls are based on one of an industry standard framework and a custom framework.

22. The non-transitory computer-readable storage media of claim 19, wherein moving the current state of the client system towards the target state of the client system is based on an initial score derived from the control information and a target score derived from target control information.

23. The non-transitory computer-readable media of claim 19, further storing:
one or more instructions that, when executed, cause the at least one processing device to:
generate one or more progress reports utilizing the control information,
wherein the control information is timestamped.

24. The non-transitory computer-readable media of claim 19, further storing:
one or more instructions that, when executed, cause the at least one processing device to:
display, on a display, the control information in one or more graphical formats, wherein the one or more graphical formats include one or more of a spider chart, a radar chart, a bar chart, and a table.

25. The non-transitory computer-readable media of claim 19, further storing:
one or more instructions that, when executed, cause the at least one processing device to:
identify, utilizing an audit trail, changes to one or more of a user name, a s date, a time, a a media access control (MAC) address, an Internet Protocol (IP) address, a location, a device type, and a biometric recognition.

26. The non-transitory computer-readable media of claim 19, wherein the control information indicates one of whether the client system is in compliance with a particular cybersecurity control, is not in compliance with the particular cybersecurity control, is in partial compliance with the particular cybersecurity control, and that the s particular cybersecurity control is not applicable the client system.

27. A non-transitory computer-readable media storing:
one or more instructions that, when executed, cause the at least one processing device to:
receive, over a network and from a client system, control information s associated with one or more cybersecurity controls, wherein the control information indicates a current state of the client system with respect to each cybersecurity control of the one or more cybersecurity controls;
transmit, over the network and to the client system, one or more query scripts based on at least a target state of the client system and the control information;
receive, over the network and from the client system, one or more responses to the one or more query scripts;
transmit, over the network and to the client system, one or more suggestions for moving cybersecurity of the client system from the current state towards the target state, wherein the one or more suggestions are based on at least the one or more responses and the current state of the client system;

determine if the client computing system has been updated according to the one or more suggestions;

in response to determining that a particular cybersecurity control has been updated based on the one or more suggestions, provide, to the client system, a new compliance value for the particular cybersecurity control; and in response to determining that the particular cybersecurity control has not been updated based on the one or more suggestions, provide, to the client system, an alert indicating that the particular cybersecurity control has not been updated.

28. The non-transitory computer-readable storage media of claim 27, wherein the one or more suggestions are created using logic, wherein the logic includes one or more of artificial intelligence, machine learning, fuzzy logic, and neural networks.

29. The non-transitory computer-readable storage media of claim 27, wherein the one or more cybersecurity controls are based on one of an industry standard framework and a custom framework.

30. The non-transitory computer-readable storage media of claim 27, wherein moving the current state of the client system towards the target state of the client system is based on an initial score derived from the control information and a target score derived from target control information.

31. The non-transitory computer-readable media of claim 27, further storing:

one or more instructions that, when executed, cause the at least one processing device to:

generate one or more progress reports utilizing the control information, wherein the control information is timestamped.

32. The non-transitory computer-readable media of claim 27, further storing:

one or more instructions that, when executed, cause the at least one processing device to:

display, on a display, the control information in one or more graphical formats, wherein the one or more graphical formats include one or more of a spider chart, a radar chart, a bar chart, and a table.

33. The non-transitory computer-readable media of claim 27, further storing:

one or more instructions that, when executed, cause the at least one processing device to:

identify, utilizing an audit trail, changes to one or more of a user name, a date, a time, a a media access control (MAC) address, an Internet Protocol (IP) address, a location, a device type, and a biometric recognition.

34. The non-transitory computer-readable media of claim 27, wherein the control information indicates one of whether the client system is in compliance with a particular cybersecurity control, is not in compliance with the particular cybersecurity control, is in partial compliance with the particular cybersecurity s control, and that the particular cybersecurity control is not applicable the client system.

35. A method, comprising:

receiving, from a client system and at a cybersecurity system, control information associated with one or more cybersecurity controls, wherein the control information indicates a current state of the client system with respect to each cybersecurity control of s the one or more cybersecurity controls;

transmitting, over the network and to the client system, one or more query scripts based on at least a target state of the client system and the control information;

receiving, over the network and from the client system, one or more responses to the one or more query scripts; and transmitting, over the network and to the client system, one or more suggestions for moving cybersecurity of the client system from the current state towards the target state, wherein the one or more suggestions are based on at least the one or more responses and the current state of the client system, and wherein the one or more suggestions include one or more updates to be made to the client system to improve the cybersecurity of the client system.

36. A cybersecurity system, comprising:

processing logic configured to:

receive, over a network and from a client system, control information associated with one or more cybersecurity controls, wherein the control information indicates a current state of the client system with respect to each cybersecurity control of the one or more cybersecurity controls;

transmit, over the network and to the client system, one or more query scripts based on at least a target state of the client system and the control information;

receive, over the network and from the client system, one or more responses to the one or more query scripts; and transmit, over the network and to the client system, one or more suggestions for moving cybersecurity of the client system from the current state towards the target state, wherein the one or more suggestions are based on at least the one or more responses and is the current state of the client system, and wherein the one or more suggestions include one or more updates to be made to the client system to improve at least one of confidentiality, integrity, and availability associated with the client system.

* * * * *